(12) United States Patent
Wang et al.

(10) Patent No.: US 12,177,502 B2
(45) Date of Patent: Dec. 24, 2024

(54) CLOUD PHONE-BASED LIVE STREAMING METHOD AND APPARATUS

(71) Applicant: Huawei Cloud Computing Technologies Co., Ltd., Guizhou (CN)

(72) Inventors: Xiang Wang, Shenzhen (CN); Xinzhe Gong, Shenzhen (CN); Jiadun Chen, Shenzhen (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 0 days.

(21) Appl. No.: 17/871,381

(22) Filed: Jul. 22, 2022

(65) Prior Publication Data

US 2022/0360830 A1    Nov. 10, 2022

Related U.S. Application Data

(63) Continuation of application No. PCT/CN2021/073408, filed on Jan. 22, 2021.

(30) Foreign Application Priority Data

| Jan. 22, 2020 | (CN) | .......................... 202010074328.3 |
| Nov. 30, 2020 | (CN) | .......................... 202011377603.5 |

(51) Int. Cl.
*H04N 21/239* (2011.01)
*H04N 21/2187* (2011.01)
*H04N 21/2343* (2011.01)

(52) U.S. Cl.
CPC ..... *H04N 21/2396* (2013.01); *H04N 21/2187* (2013.01); *H04N 21/23439* (2013.01)

(58) Field of Classification Search
None
See application file for complete search history.

(56) References Cited

U.S. PATENT DOCUMENTS

| 10,374,866 B1 * | 8/2019 | Berg | ...................... H04L 67/148 |
| 2004/0071214 A1 * | 4/2004 | Burg | .................... H04N 21/658 |
| | | | 375/240.03 |

(Continued)

FOREIGN PATENT DOCUMENTS

| CN | 106713945 A | 5/2017 |
| CN | 107527304 A | 12/2017 |

(Continued)

OTHER PUBLICATIONS

Cori Faklaris et al: "An Exploration of User and Bystander Attitudes About Mobile Live-Streaming Video", arxiv.org, Cornell University Library, 201 Olin Library Cornell University Ithaca, NY 14853, Feb. 18, 2019, XP081030437, 12 pages.

(Continued)

*Primary Examiner* — Jason K Lin
(74) *Attorney, Agent, or Firm* — Conley Rose, P.C.

(57) ABSTRACT

A live streaming method includes that a live streaming platform plays a live video generated by a first cloud phone under control of a first client, where the first cloud phone and the first client are located in a first region. The live streaming platform switches control permission for the first cloud phone from the first client to a second client. The live streaming platform migrates a running environment of the first cloud phone to a second cloud phone online, where the second cloud phone and the second client are located in a second region. The live streaming platform plays a live video generated by the second cloud phone under control of the second client.

20 Claims, 25 Drawing Sheets

(56) References Cited

U.S. PATENT DOCUMENTS

2017/0366606 A1* 12/2017 Ben-Shaul .............. G06F 3/061
2019/0122637 A1    4/2019 Sanders et al.
2020/0014740 A1* 1/2020 Chao ....................... H04L 65/75
2021/0026707 A1* 1/2021 Rosenberg .......... G06F 9/45558

FOREIGN PATENT DOCUMENTS

| CN | 107995456 A |   | 5/2018  |             |
|----|-------------|---|---------|-------------|
| CN | 109597628 A |   | 4/2019  |             |
| CN | 110213601 A | * | 9/2019  | ............. A63F 13/35 |
| CN | 110430436 A |   | 11/2019 |             |
| CN | 110536146 A |   | 12/2019 |             |

OTHER PUBLICATIONS

Pascal Lessel et al: "Viewers Perception of Elements Used in Game Live-Streams", Oct. 10, 2018 ; Oct. 10, 2018-Oct. 11, 2018, Oct. 10, 2018, pp. 59-68, XP058418822, 10 pages.

* cited by examiner

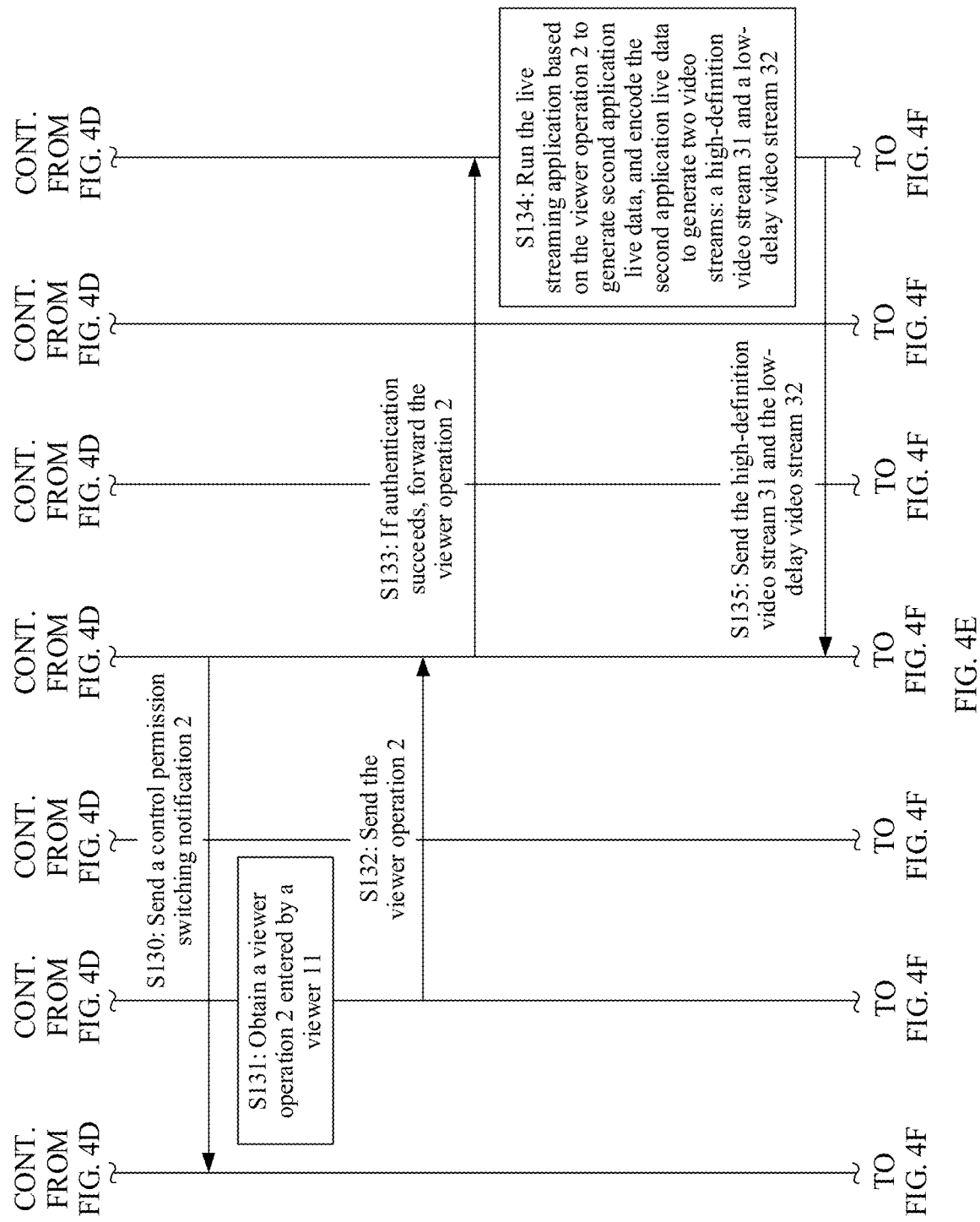

CLOUD PHONE-BASED LIVE STREAMING METHOD AND APPARATUS

CROSS-REFERENCE TO RELATED APPLICATIONS

This is a continuation of International Patent Application No. PCT/CN2021/073408 filed on Jan. 22, 2021, which claims priority to Chinese Patent Application No. 202010074328.3 filed on Jan. 22, 2020 and Chinese Patent Application No. 202011377603.5 filed on Nov. 30, 2020. All of the aforementioned patent applications are hereby incorporated by reference in their entireties.

TECHNICAL FIELD

This application relates to the field of computer technologies, and in particular, to a cloud phone-based live streaming method and an apparatus.

BACKGROUND

With development of technologies, cloud phone applications become one of development directions of mainstream technologies in the future.

Corresponding software development kits for videos, audio, and controlling are provided in each cloud phone such that a user can deploy an interface in each cloud phone, to extract, from the cloud phone, data such as audio data and video data that is generated by the cloud phone, and transmit the data through the interface. In this way, the data such as the audio data and the video data of the cloud phone can be restored remotely.

However, the cloud phone also has a geographical limitation. When a cloud phone at location A needs to provide data for a user end at location B, the data also needs to be transmitted to a related network device at location B through a network, and then the data is transmitted to the user end at location B using the network device at location B. This affects a data transmission delay.

SUMMARY

This application provides a cloud phone-based live streaming method and an apparatus. Control permission of a first client in a first region is switched to a second client, and a first cloud phone in the first region is migrated to a second cloud phone in a second region such that the second client can directly control the second cloud phone to generate a live video. This reduces transmission time for the second client to send a control instruction to the first cloud phone in the first region such that user experience is improved.

According to a first aspect, this application provides a cloud phone-based live streaming method includes that a live streaming platform plays a live video generated by a first cloud phone under control of a first client, where the first cloud phone and the first client are located in a first region. The live streaming platform switches control permission for the first cloud phone from the first client to a second client. The live streaming platform migrates the first cloud phone to a second cloud phone online, where the second cloud phone and the second client are located in a second region. The live streaming platform plays a live video generated by the second cloud phone under control of the second client.

The live streaming platform switches the control permission of the first client in the first region to the second client in the second region, and migrates the first cloud phone corresponding to the first client in the first region to the second cloud phone in the second region such that the second client can directly control the second cloud phone to generate a live video. This reduces transmission time for the second client to send a control instruction to the first cloud phone in the first region such that user experience is improved.

In a possible implementation of the first aspect, that the live streaming platform switches control permission for the first cloud phone from the first client to a second client includes that the live streaming platform receives a control permission switching request sent by the first client. The live streaming platform revokes the control permission of the first client for the first cloud phone based on the control permission switching request. The live streaming platform grants the control permission for the first cloud phone to the second client.

The control permission switching request may be triggered on the first client to obtain the control permission for the cloud phone such that viewer participation in the live streaming is improved.

In a possible implementation of the first aspect, that the live streaming platform switches control permission for the first cloud phone from the first client to a second client includes that the live streaming platform receives a control permission switching request sent by the second client. The live streaming platform forwards the control permission switching request to the first client. The live streaming platform receives a switching confirmation request sent by the first client, where the switching confirmation request indicates that the first client agrees to switch the control permission for the first cloud phone from the first client to the second client. The live streaming platform revokes the control permission of the first client for the first cloud phone based on the switching confirmation request. The live streaming platform grants the control permission for the first cloud phone to the second client.

The control permission switching request may be triggered on the second client to obtain the control permission for the cloud phone such that viewer participation in the live streaming is improved.

In a possible implementation of the first aspect, that the live streaming platform plays a live video generated by the second cloud phone under control of the second client includes that the live streaming platform receives a control instruction sent by the second client, where the control instruction is used to control the second cloud phone. The live streaming platform generates a live video based on the control instruction. The live streaming platform plays the live video.

An application is run by receiving a viewer operation on the second client, and second application live data is sent to the live streaming platform such that a process in which a viewer operates the cloud phone can be played through live streaming. This improves viewer participation in the live streaming, and allows the viewer to participate in the live streaming.

In a possible implementation of the first aspect, that the live streaming platform plays the live video includes that the live streaming platform sends a high-definition live video to the first client, where the high-definition live video is a live video whose definition is greater than a preset threshold. The live streaming platform sends a low-delay live video to the second client, where the low-delay live video is a live video whose definition is less than the preset threshold.

Live videos with different definition are sent to different clients. This improves efficiency of transmitting live videos and further improves user experience.

According to a second aspect, this application provides a live streaming platform apparatus that includes a live streaming module configured to play a live video generated by a first cloud phone under control of a first client, where the first cloud phone and the first client are located in a first region, a switching module configured to switch control permission for the first cloud phone from the first client to a second client, and a migration module configured to migrate the first cloud phone to a second cloud phone online, where the second cloud phone and the second client are located in a second region.

The live streaming module is further configured to play a live video generated by the second cloud phone under control of the second client.

Optionally, the live streaming platform further includes a receiving module configured to receive a control permission switching request sent by the first client, a processing module configured to revoke the control permission of the first client for the first cloud phone based on the control permission switching request, and a grant module configured to grant the control permission for the first cloud phone to the second client.

Optionally, the receiving module is further configured to receive a control permission switching request sent by the second client.

The switching module is further configured to forward the control permission switching request to the first client.

The receiving module is further configured to receive a switching confirmation request sent by the first client, where the switching confirmation request indicates that the first client agrees to switch the control permission for the first cloud phone from the first client to the second client.

The processing module is further configured to revoke the control permission of the first client for the first cloud phone based on the switching confirmation request.

The grant module is further configured to grant the control permission for the first cloud phone to the second client.

Optionally, the receiving module is further configured to receive a control instruction sent by the second client, where the control instruction is used to control the second cloud phone.

The processing module is further configured to generate a live video based on the control instruction.

The live streaming module is further configured to play the live video.

Optionally, the live streaming platform further includes a sending module configured to send a high-definition live video to the first client, where the high-definition live video is a live video whose definition is greater than a preset threshold.

The sending module is further configured to send a low-delay live video to the second client, where the low-delay live video is a live video whose definition is less than the preset threshold.

Any one of the second aspect or the implementations of the second aspect is an apparatus implementation corresponding to any one of the first aspect or the implementations of the first aspect. The description in any one of the first aspect or the implementations of the first aspect is applicable to any one of the second aspect or the implementations of the second aspect. Details are not described herein.

According to a third aspect, this application provides a cloud phone-based live streaming method, where the cloud phone is disposed in a data center and establishes communication with a live streaming platform. The method includes the following steps. The cloud phone receives a first live streamer operation sent by the live streaming platform. The live streaming platform separately establishes communication with a first terminal and a second terminal. The first live streamer operation is sent by the first terminal to the live streaming platform. The cloud phone runs an application based on the first live streamer operation, generates first application live data, and sends the first application live data to the live streaming platform. The first application live data is sent to the first terminal and the second terminal through the live streaming platform.

The cloud phone runs on a network side. The cloud phone on the network side runs the application, generates the first application live data, and performs live streaming on the live streaming platform such that the first terminal may not need to perform the foregoing actions. This reduces requirements for hardware and bandwidth of the first terminal in a live streaming process.

In a possible implementation of the third aspect, the first terminal generates a first live streaming platform interface, the first terminal displays the first live streaming platform interface, the second terminal generates a second live streaming platform interface, and the second terminal displays the second live streaming platform interface. The method further includes that the first terminal displays a first application live video in the first live streaming platform interface based on the first application live data. The second terminal displays the first application live video in the second live streaming platform interface based on the first application live data.

The first terminal and the second terminal may obtain the first application live data from the live streaming platform and display the first application live video, to implement real-time live streaming of an operation of the cloud phone.

In a possible implementation of the third aspect, the live streaming platform further establishes a connection to a third terminal. Before the live streaming platform sends a first control permission switching notification to the first terminal and sends a second control permission switching notification to the second terminal based on a control permission switching request, the method further includes that the live streaming platform receives a control permission switching request sent by the third terminal for the cloud phone. The live streaming platform selects the second terminal from the second terminal and the third terminal according to an arbitration rule.

In a possible implementation of the third aspect, the arbitration rule is, for example, a rule such as random selection, bidding, or selection based on a login account level.

A plurality of viewers may apply to the live streaming platform for exclusive control permission for the cloud phone at the same time. The live streaming platform may select, according to a preset arbitration rule, a terminal corresponding to a viewer. This can improve fun in the live streaming process.

In a possible implementation of the third aspect, before the live streaming platform sends a first control permission switching notification to the first terminal and sends a second control permission switching notification to the second terminal based on a control permission switching request, the method further includes the following steps. The live streaming platform sends a control permission transfer request to the first terminal, where the control permission transfer request is used to request the first terminal to transfer the control permission for the cloud phone to the second terminal. The live streaming platform receives a control permission transfer confirmation sent by the first terminal for the control permission transfer request.

When the viewer applies to the live streaming platform for the exclusive control permission for the cloud phone using the second terminal, the live streaming platform queries the first terminal corresponding to the live streamer whether to allow switching of the control permission, and sends the first control permission switching notification and the second control permission switching notification only after the live streamer performs confirmation. This can guarantee the permission of the live streamer.

In a possible implementation of the third aspect, the method further includes the following steps. The live streaming platform receives a viewer operation sent by the second terminal, and shields a second live streamer operation sent by the first terminal. The live streaming platform sends the viewer operation to the cloud phone. The cloud phone runs the application based on the viewer operation, generates second application live data, and sends the second application live data to the live streaming platform. The live streaming platform sends the second application live data to the first terminal and the second terminal. The first terminal displays a second application live video in the first live streaming platform interface based on the second application live data. The second terminal displays the second application live video in the second live streaming platform interface based on the second application live data.

Therefore, a process in which the viewer operates the cloud phone can be played through live streaming on the first terminal and the second terminal using the live streaming platform.

In a possible implementation of the third aspect, the method further includes the following steps. The live streaming platform receives a control permission sharing request sent by the second terminal for the cloud phone. The live streaming platform sends a first control permission sharing notification to the first terminal based on the control permission sharing request, and sends a second control permission sharing notification to the second terminal. The first control permission sharing notification is used to notify the first terminal to share the control permission for the cloud phone with the second terminal, and the second control permission sharing notification is used to notify the second terminal to share the control permission for the cloud phone with the first terminal.

Therefore, the viewer may further apply to the live streaming platform using the second terminal for operating the cloud phone together with the live streamer and performing live streaming on the operation process.

Optionally, the live streaming platform further establishes a connection to a third terminal. Before the live streaming platform sends the first control permission sharing notification to the first terminal and sends the second control permission sharing notification to the second terminal based on the control permission sharing request, the method further includes the following steps. The live streaming platform receives a control permission sharing request sent by the third terminal for the cloud phone. The live streaming platform selects the second terminal from the second terminal and the third terminal according to an arbitration rule.

In a possible implementation of the third aspect, the arbitration rule is, for example, a rule such as random selection, bidding, or selection based on a login account level.

A plurality of viewers may apply to the live streaming platform for sharing the control permission for the cloud phone at the same time. The live streaming platform may select, according to a preset arbitration rule, a terminal corresponding to a viewer. This can improve fun in the live streaming process.

In a possible implementation of the third aspect, the first application live data is sent to the live streaming platform in the following manner. The cloud phone performs low-delay video encoding processing on the first application live data to generate a low-delay video stream, and performs high-definition video encoding processing on the first application live data to generate a high-definition video stream, where a delay of the high-definition video stream is higher than a delay of the low-delay video stream. The cloud phone sends the low-delay video stream and the high-definition video stream to the live streaming platform. The live streaming platform sends the low-delay video stream to the first terminal, and sends the high-definition video stream to the second terminal.

The live streaming platform sends the low-delay video stream to the first terminal, and sends the high-definition video stream to the second terminal, to ensure that the live streamer can watch the first application live video on the first terminal in a low-delay manner, and enter a live streamer operation in a timely manner to control the cloud phone application.

In a possible implementation of the third aspect, before the cloud phone receives the first live streamer operation sent by the live streaming platform, the method further includes the following steps. The live streaming platform receives an application for a live streaming studio that is sent by the first terminal. The live streaming platform sends, to a cloud phone management node based on the application for a live streaming studio, an application for using a cloud phone. The cloud phone management node selects a cloud phone from a cloud phone resource pool based on the application for using a cloud phone, and sets the cloud phone to establish a connection to the live streaming platform.

The cloud phone can be selected from the cloud phone resource pool based on a live streamer requirement. This can improve resource utilization of the data center.

In a possible implementation of the third aspect, the method further includes the following steps. The live streaming platform receives a live streaming ending request sent by the first terminal. The live streaming platform sends, to the cloud phone management node based on an application for closing the live streaming studio, an application for disabling the cloud phone. The cloud phone management node sets, based on the application for disabling the cloud phone, the cloud phone to be disconnected from the live streaming platform.

The cloud phone can be canceled from the cloud phone resource pool based on a live streamer requirement. This can improve resource utilization of the data center.

According to a fourth aspect, a live streaming system is provided, and includes a cloud phone, a live streaming platform, a first terminal, and a second terminal. The cloud phone is disposed in a data center and establishes communication with the live streaming platform. The live streaming platform separately establishes communication with the first terminal and the second terminal. The first terminal is configured to receive a first live streamer operation, and send the first live streamer operation to the live streaming platform. The live streaming platform is configured to send the first live streamer operation to the cloud phone. The cloud phone is configured to run an application based on the first live streamer operation, generate first application live data, and send the first application live data to the live streaming platform. The live streaming platform is configured to send the first application live data to the first terminal and the second terminal.

Any one of the fourth aspect or the implementations of the fourth aspect is a system implementation corresponding to any one of the third aspect or the implementations of the third aspect. The description in any one of the third aspect or the implementations of the third aspect is applicable to any one of the fourth aspect or the implementations of the fourth aspect. Details are not described herein.

According to a fifth aspect, a live streaming method is provided, and establishing communication with a live streaming platform, obtaining control permission for a cloud phone on a network side using the live streaming platform, generating and displaying a first live streaming platform interface, receiving a first live streamer operation in the first live streaming platform interface, sending the first live streamer operation to the live streaming platform, where the first live streamer operation is used to indicate the cloud phone to run an application and generate first application live data, receiving the first application live data using the live streaming platform, and displaying a first application live video in the first live streaming platform interface based on the first application live data.

In a possible implementation of the fifth aspect, the method further includes displaying a viewer icon in the first live streaming platform interface, and when the viewer icon is selected, sending a control permission switching request to the live streaming platform, where the control permission switching request is used to request to transfer the control permission for the cloud phone to a client indicated by the viewer icon.

According to a sixth aspect, a computer-readable storage medium is provided, and includes instructions. When the instructions are run on a computing device, the computing device is enabled to perform the method according to any one of the fifth aspect or the implementations of the fifth aspect.

According to a seventh aspect, a client is provided, and includes an interface generation module configured to establish communication with a live streaming platform, obtain control permission for a cloud phone on a network side using the live streaming platform, and generate and display a first live streaming platform interface, a live streamer operation obtaining module configured to receive a first live streamer operation in the first live streaming platform interface, a sending module configured to send the first live streamer operation to the live streaming platform, where the first live streamer operation is used to indicate the cloud phone to run an application and generate first application live data, and a receiving module configured to receive the first application live data using the live streaming platform. The interface generation module is further configured to display a first application live video in the first live streaming platform interface based on the first application live data.

Any one of the seventh aspect or the implementations of the seventh aspect is an apparatus implementation corresponding to any one of the fifth aspect or the implementations of the fifth aspect. The description in any one of the fifth aspect or the implementations of the fifth aspect is applicable to any one of the seventh aspect or the implementations of the seventh aspect. Details are not described herein.

According to an eighth aspect, a live streaming method is provided, and includes receiving a first live streamer operation on a first client, running an application based on the first live streamer operation; generating first application live data, and sending the first application live data to a live streaming platform for live streaming.

In a possible implementation of the eighth aspect, the method further includes receiving a viewer operation on a second client, running the application based on the viewer operation, generating second application live data, and sending the second application live data to the live streaming platform for live streaming.

In a possible implementation of the eighth aspect, the method further includes receiving a viewer operation on a second client and a second live streamer operation on the first client, running the application based on the viewer operation and the second live streamer operation, generating third application live data, and sending the third application live data to the live streaming platform for live streaming.

According to a ninth aspect, a computer-readable storage medium is provided, and includes instructions. When the instructions are run on a computing device, the computing device is enabled to perform the method according to any one of the eighth aspect or the implementations of the eighth aspect.

According to a tenth aspect, a client is provided, and includes an interface generation module configured to establish communication with a live streaming platform, and generate and display a second live streaming platform interface, and a receiving module configured to receive first application live data using the live streaming platform. The interface generation module is further configured to display a first application live video in the second live streaming platform interface based on the first application live data, where the first application live data is generated when a cloud phone on a network side is controlled to run an application based on an operation of another client.

Any one of the tenth aspect or the implementations of the tenth aspect is an apparatus implementation corresponding to any one of the eighth aspect or the implementations of the eighth aspect. The description in any one of the eighth aspect or the implementations of the eighth aspect is applicable to any one of the tenth aspect or the implementations of the tenth aspect. Details are not described herein.

According to an eleventh aspect, a live streaming method is provided, and includes providing a first live streaming platform interface, where the first live streaming platform interface displays a plurality of live streaming studio icons, when a first live streaming studio icon among the plurality of live streaming studio icons is selected, displaying a screen displayed video of a first cloud phone in the first live streaming platform interface, where the screen displayed video includes an icon of an application installed on the first cloud phone, receiving a first live streamer operation in the first live streaming platform interface, where the first live streamer operation is used to indicate the cloud phone to run the application and generate first application live data, and displaying a first application live video in the first live streaming platform interface based on the first application live data.

In a possible implementation of the eleventh aspect, the method further includes displaying a viewer icon in the first live streaming platform interface, and when the viewer icon is selected, sending a control permission switching request to the live streaming platform, where the control permission switching request is used to request to transfer control permission for a cloud phone to a client indicated by the viewer icon.

In a possible implementation of the eleventh aspect, the method further includes displaying a delay icon in the first live streaming platform interface, where the delay icon displays a delay of the first application live data.

According to a twelfth aspect, a live streaming method is provided, and includes receiving a first live streamer operation on a first client, running an application based on the first live streamer operation, generating first application live data, and sending the first application live data to a live streaming platform for live streaming.

In a possible implementation of the twelfth aspect, the method further includes receiving a viewer operation on a second client, running the application based on the viewer operation, generating second application live data, and sending the second application live data to the live streaming platform for live streaming.

In a possible implementation of the twelfth aspect, the method further includes receiving a viewer operation on a second client and a second live streamer operation on the first client, running the application based on the viewer operation and the second live streamer operation; generating third application live data, and sending the third application live data to the live streaming platform for live streaming.

According to a thirteenth aspect, a cloud phone is provided, and includes a receiving module configured to receive a first live streamer operation on a first client; an application live data generation module, configured to run an application based on the first live streamer operation, and generate first application live data; and a sending module, configured to send the first application live data to a live streaming platform for live streaming.

Any one of the thirteenth aspect or the implementations of the thirteenth aspect is an apparatus implementation corresponding to any one of the twelfth aspect or the implementations of the twelfth aspect. The description in any one of the twelfth aspect or the implementations of the twelfth aspect is applicable to any one of the thirteenth aspect or the implementations of the thirteenth aspect. Details are not described herein.

In embodiments of this application, the control permission of the first client in the first region is switched to the second client, and the first cloud phone in the first region is migrated to the second cloud phone in the second region such that the second client can directly control the second cloud phone to generate the live video. This reduces transmission time for the second client to send a control instruction to the first cloud phone in the first region such that user experience is improved.

BRIEF DESCRIPTION OF DRAWINGS

FIG. 4A to FIG. 4F are data exchange diagrams of a live streaming method according to an embodiment of the present disclosure;

DESCRIPTION OF EMBODIMENTS

Figure 1A:
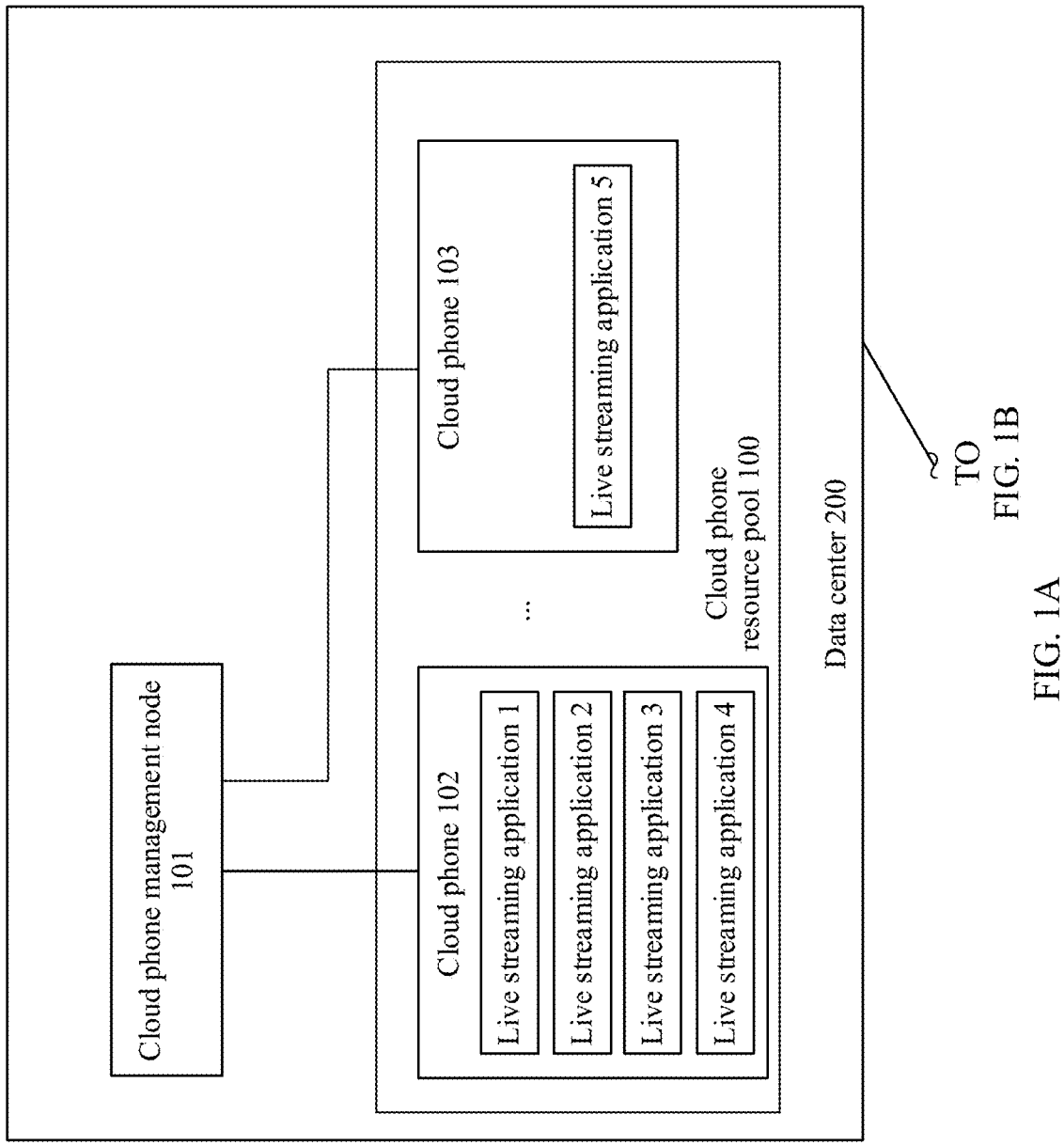
FIG. 1A and FIG. 1B are schematic diagrams of a system architecture of a live streaming system according to an embodiment of the present disclosure.

The following describes technical solutions in embodiments of the present disclosure with reference to the accompanying drawings in embodiments of the present disclosure. It is clear that the described embodiments are merely some rather than all of embodiments of the present disclosure. All other embodiments obtained by a person of ordinary skill in the art based on embodiments of the present disclosure without creative efforts shall fall within the protection scope of the present disclosure.

For ease of understanding of embodiments of this application, some data in this application is first explained and described.

Cloud phone: A cloud phone refers to a cloud service that runs on a physical server and has a mobile phone operating system and a virtual mobile phone function. The cloud service is usually implemented using a container. Essentially, an application on a mobile phone is transferred to a container in a physical server of a data center for running. Different cloud phones are isolated from each other using containers, and do not interfere with each other. A mobile phone application may be installed on the cloud phone, and the mobile phone application runs in the cloud phone. An audio and video stream generated in a running process may be sent to the local mobile phone for displaying and playing. A control command generated by the local mobile phone based on the audio and video stream displayed and played locally may be sent to the cloud phone. The cloud phone controls a running status of the application according to the control command. In this way, the mobile phone application in the local mobile phone may be transferred to the cloud phone in the data center for running. A mobile phone application that consumes a large quantity of hardware resources such as a two-dimensional or three-dimensional game or industrial design software does not need to be installed on the local mobile phone, and there is no need to install a large quantity of mobile phone applications on the local mobile phone (that is, the mobile phone applications may be uninstalled to the cloud phone), to implement local lightweight. In addition, because the mobile phone applications run on the cloud phone, even if the local mobile phone has no high hardware configuration, the user may have an opportunity to use a mobile phone application having a high hardware configuration requirement. Therefore, the local mobile phone does not need to be replaced due to a higher hardware requirement.

It should be noted that the cloud phone may alternatively be implemented using a virtual machine. This is not limited in embodiments of the present disclosure.

Network live streaming: Network live streaming refers to an entertainment form in which an instant video is publicly played on the Internet with the emergence of online audio and video platforms. Currently, the network live streaming is most commonly used to broadcast entertainment-related content. A protagonist who performs or hosts network live streaming is usually called a live streamer. A biggest difference between live streaming and conventional recorded video uploading is that a viewer can leave bullet comments to interact with the live streamer in real time, and the live streamer can adjust the program content or please the viewer in a timely manner based on the feedback of the viewer.

Live streaming platform: A live streaming platform is an online audio and video platform, and is implemented as a server or a server cluster that publicly plays an instant video on the Internet. The live streaming platform provides a live streaming studio to play the instant video in the live streaming studio. The live streaming studio is accessed by a user who registers with the live streaming platform and chooses to enter the live streaming studio. The user may access the live streaming studio using a terminal device (referred to as a viewer terminal below) of the user, to view the instant video.

To resolve a problem in the conventional technology, embodiments of the present disclosure provide a cloud phone-based live streaming method and a device. The live streaming method includes the following steps.

A live streaming platform plays a live video generated by a first cloud phone under control of a first client, where both the first cloud phone and the first client are located in a first region.

The live streaming platform switches control permission for the first cloud phone from the first client to a second client.

The live streaming platform migrates a running environment of the first cloud phone to a second cloud phone online, where both the second cloud phone and the second client are located in a second region.

The live streaming platform plays a live video generated by the second cloud phone under control of the second client.

In embodiments of this application, the control permission of the first client in the first region is switched to the second client, and the running environment of the first cloud phone in the first region is migrated to the second cloud phone in the second region such that the second client can directly control the second cloud phone to generate the live video. This reduces transmission time for the second client to send a control instruction to the first cloud phone in the first region such that user experience is improved.

In embodiments of the present disclosure, a region refers to a geographical region, for example, South China, North China, the eastern United States, or the western United States.

The following describes embodiments of the present disclosure in detail based on the general idea described above.

Figure 1B:
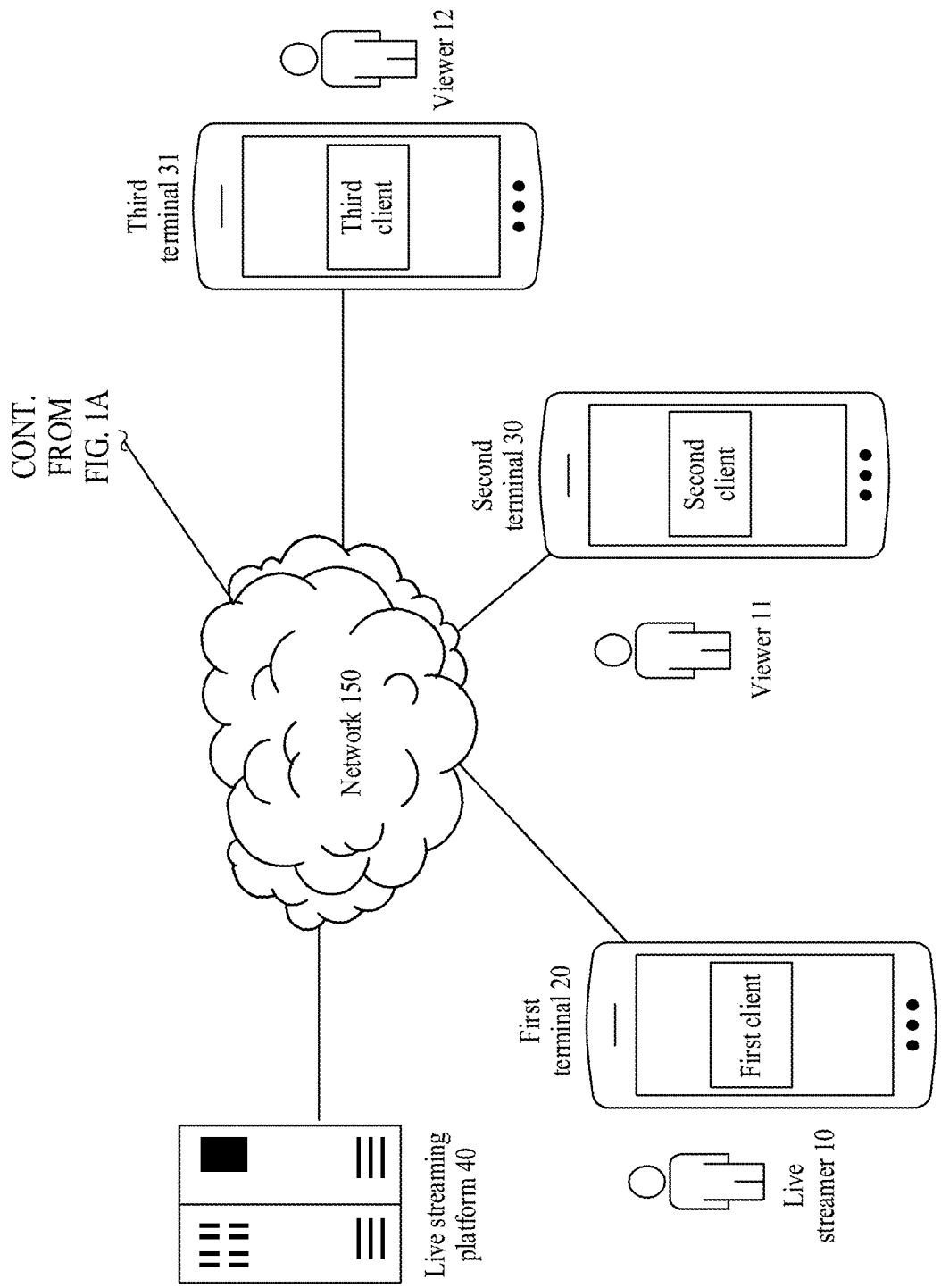

FIG. 1A and FIG. 1B are schematic diagrams of a system architecture of a live streaming system according to an embodiment of the present disclosure.

As shown in FIG. 1A and FIG. 1B, the live streaming system in this embodiment of the present disclosure includes a live streaming platform 40, a first terminal 20, a second terminal 30, a third terminal 31, and a data center 200 that access a network 150.

Clients of the live streaming platform are installed on the first terminal 20, the second terminal 30, and the third terminal 31, and are respectively a first client, a second client, and a third client. The first client, the second client, and the third client establish connections to and exchange data with the live streaming platform 40.

It should be noted that two or more clients may be supported in this embodiment of the present disclosure, and there may be two or more corresponding terminals.

In addition, the client runs on the terminal. In this embodiment of the present disclosure, it may be considered that an action performed by the client is performed by the terminal that runs the client.

The live streaming platform 40 and the data center 200 are located on a network side. A cloud phone resource pool 100 and a cloud phone management node 101 are disposed in the data center 200. The cloud phone resource pool 100 includes a plurality of cloud phones such as a cloud phone 102 and a cloud phone 103. A live streaming application 1, a live streaming application 2, a live streaming application 3, and a live streaming application 4 are installed in the cloud phone 102, and a live streaming application 5 is installed in the cloud phone 103.

Optionally, the live streaming platform 40 may alternatively be disposed in the data center 200.

For example, the live streaming application includes a mobile game, industrial design software, or other mobile phone software, and the terminal may be, for example, a mobile phone.

In an optional embodiment, the terminal may be, for example, a tablet computer, a personal digital assistant, or a laptop computer. The terminal is provided with a voice collection device and a camera.

In this embodiment of the present disclosure, a live streamer 10 may operate the first terminal 20 to open the first client to access a live streaming studio provided by the live streaming platform 40, a viewer 11 may operate the second terminal 30 to open the second client to access the live streaming studio provided by the live streaming platform 40, and a viewer 12 may operate the third terminal 31 to open the third client to access the live streaming studio provided by the live streaming platform 40.

Further, the live streamer 10 may remotely control the cloud phone 102 using the first terminal 20 to run the live streaming application 1. The cloud phone 102 encodes, into a video stream, a screen displayed video generated when the live streaming application 1 is running, and sends the video stream to the live streaming platform 40. The live streaming platform 40 plays the screen displayed video in the live streaming studio such that the viewer 11 can watch the screen displayed video of the cloud phone 102 using the second terminal 30, and the viewer 12 can watch the screen displayed video of the cloud phone 102 using the third terminal 31. In this way, live streaming of the screen displayed video of the cloud phone 102 is implemented.

Figure 2:
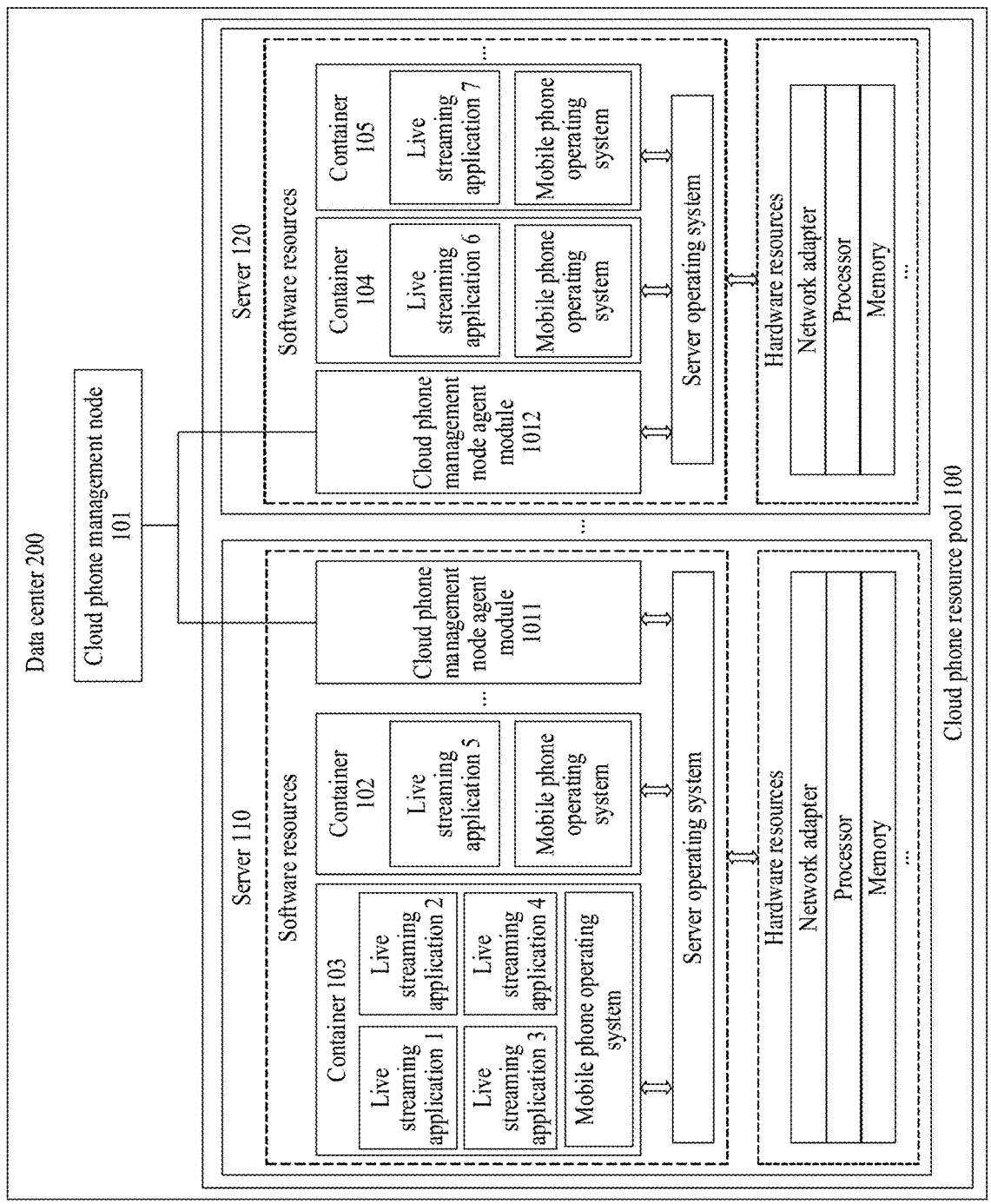
FIG. 2 is a schematic diagram of a system architecture of a data center according to an embodiment of the present disclosure.

For detailed description, refer to FIG. 2 below. FIG. 2 is a schematic diagram of a system architecture of a data center 200 according to an embodiment of the present disclosure.

As shown in FIG. 2, the data center 200 includes a cloud phone management node 101 and a cloud phone resource pool 100. The cloud phone resource pool 100 includes a plurality of physical servers such as a server 110 and a server 120. The physical server may be a general-purpose physical server, for example, an ARM server or an X86 server. This is not limited in embodiments of the present disclosure. In an actual application process, one physical server may correspond to one or more regions.

Each server in the cloud phone resource pool 100 includes hardware resources and software resources. The hardware resources include general-purpose hardware devices of the server such as a network adapter, a processor, and a memory. The software resources include a server operating system, at least one container running on the server operating system, and a cloud phone management node agent module. The cloud phone 103 in FIG. 1A and FIG. 1B may be implemented using a container 102 in FIG. 2, and the cloud phone 102 in FIG. 1A and FIG. 1B may be implemented using a container 103 in FIG. 2. A mobile phone operating system is installed in the container 103. The live streaming applications 1 to 4 run in the mobile phone operating system. A mobile phone operating system is also installed in the container 102. The live streaming application 5 runs in the mobile phone operating system. The live streaming applications 1 to 4 are isolated from the live streaming application 5 using the containers.

The cloud phone management node agent module implements full life cycle management on the container, and may be configured to monitor and collect container information of the server, and report information about the server to the cloud phone management node 101 in real time. For example, a cloud phone management node agent module 1011 on the server 110 may monitor and collect container information of the server 110. The cloud phone management node agent module 1011 receives a cloud phone control command sent by the cloud phone management node 101. The cloud phone management node agent module 1011 may control working statuses of the container 102 and the container 103 on the server 110 according to the cloud phone control command. A cloud phone management node agent module 1012 is configured to receive a cloud phone control command sent by the cloud phone management node 101. The cloud phone management node agent module 1012 may control working statuses of a container 104 and a container 105 on the server 120 according to the cloud phone control command.

The cloud phone shares the hardware resources and the operating system with another cloud phone on the server in a form of a container. Each container may include an application that a cloud phone needs and a dependency resource that each application needs. The dependency resource that the application needs may be a kernel library and a system library in the foregoing content. Each cloud phone and another cloud phone share the hardware resources and the operating system of the server. In other words, each container does not have a kernel, an application process in the container directly runs on a kernel of the server, and each cloud phone may independently and directly run on server hardware, to create an independent sandbox running environment of the application.

In a specific implementation, the cloud phone management node and the cloud phone management node agent module deployed on each server may be implemented based on a container management system such as Kubernetes or Docker.

In another embodiment, a cloud phone may alternatively be implemented using a virtual machine. This is not limited in this application.

Figure 3:
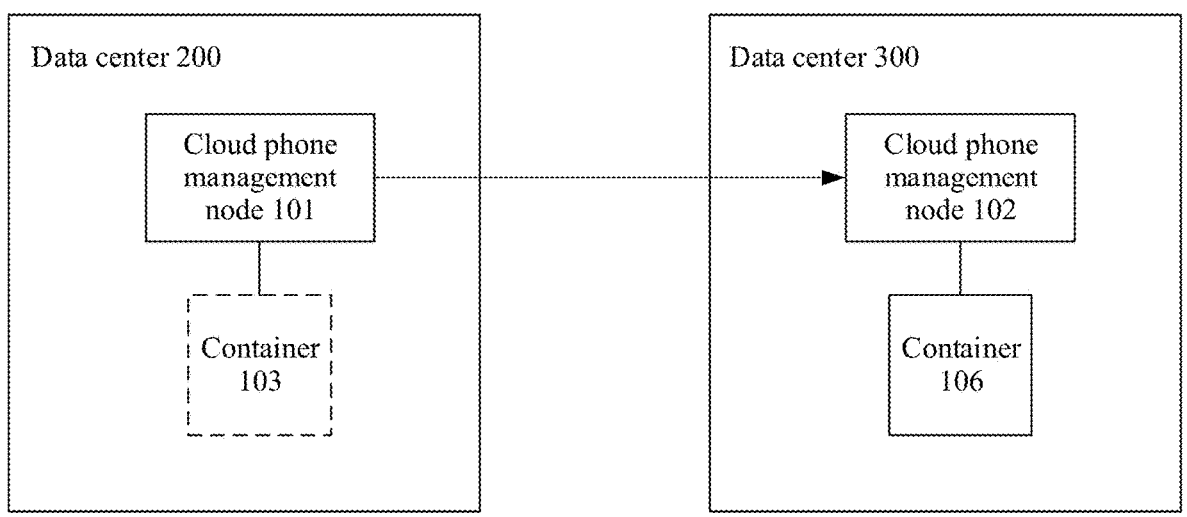
FIG. 3 is a schematic diagram of a scenario of a live streaming system according to an embodiment of this application.

FIG. 3 is a schematic diagram of a scenario of migrating a cloud phone according to an embodiment of this application.

As shown in FIG. 3, a local mobile phone client controlled by a live streamer exchanges data with a cloud phone (that is, the container 103) in the data center 200 close to the local mobile phone client of the live streamer, to generate a live video. A live video collection module collects the live video of the cloud phone (that is, the container 103) in the data center 200, and sends the live video to another viewer client.

When a viewer client needs to apply for control permission, the live streamer applies to a mobile phone management background of a live streaming platform using the local mobile phone client of the live streamer. The mobile phone management background of the live streaming platform transfers the control permission from the local mobile phone client of the live streamer to a local mobile phone client of the viewer, and migrates a running environment of the cloud phone (that is, the container 103) in the data center 200 to a cloud phone (that is, a container 106) in a data center 300. After the migration is completed, the local mobile phone client of the viewer exchanges data with the cloud phone in the data center 300, to generate a live video, and then the live video is sent to another viewer client and the local mobile phone client of the live streamer.

In embodiments of this application, the running environment of the cloud phone refers to a cloud phone image, and includes an operating system and all drivers and applications in the operating system. The application includes a live streaming application.

It should be noted that the data center 200 is a data center that is physically closer to the local mobile phone client of the live streamer, and the data center 300 is a data center that is physically closer to the local mobile phone client of the viewer. For example, the data center 200 is a data center in South China, and the data center 300 is a data center in East China. A local mobile phone of the live streamer is in South China, and a local mobile phone of the viewer is in East China. When the control permission is transferred from the local mobile phone client of the live streamer to the local mobile phone client of the viewer, the running environment of the cloud phone corresponding to the local mobile phone client of the live streamer is migrated to a cloud phone management node 102 in the data center 300 using the cloud phone management node 101 in the data center 200.

The data center 200 and the data center 300 are located in different regions.

It should be noted that, in the live streaming system scenario, the live streamer may actively transfer the control permission for the cloud phone to the viewer client, or the viewer may initiate the application to transfer the control permission to the viewer client. A specific method is described in detail in the following embodiments.

The following describes a live streaming method in embodiments of the present disclosure based on the schematic diagrams of the system architectures described in FIG. 1A and FIG. 1B and FIG. 2 and the application scenario of the live streaming system described in FIG. 3.

Figure 4A:
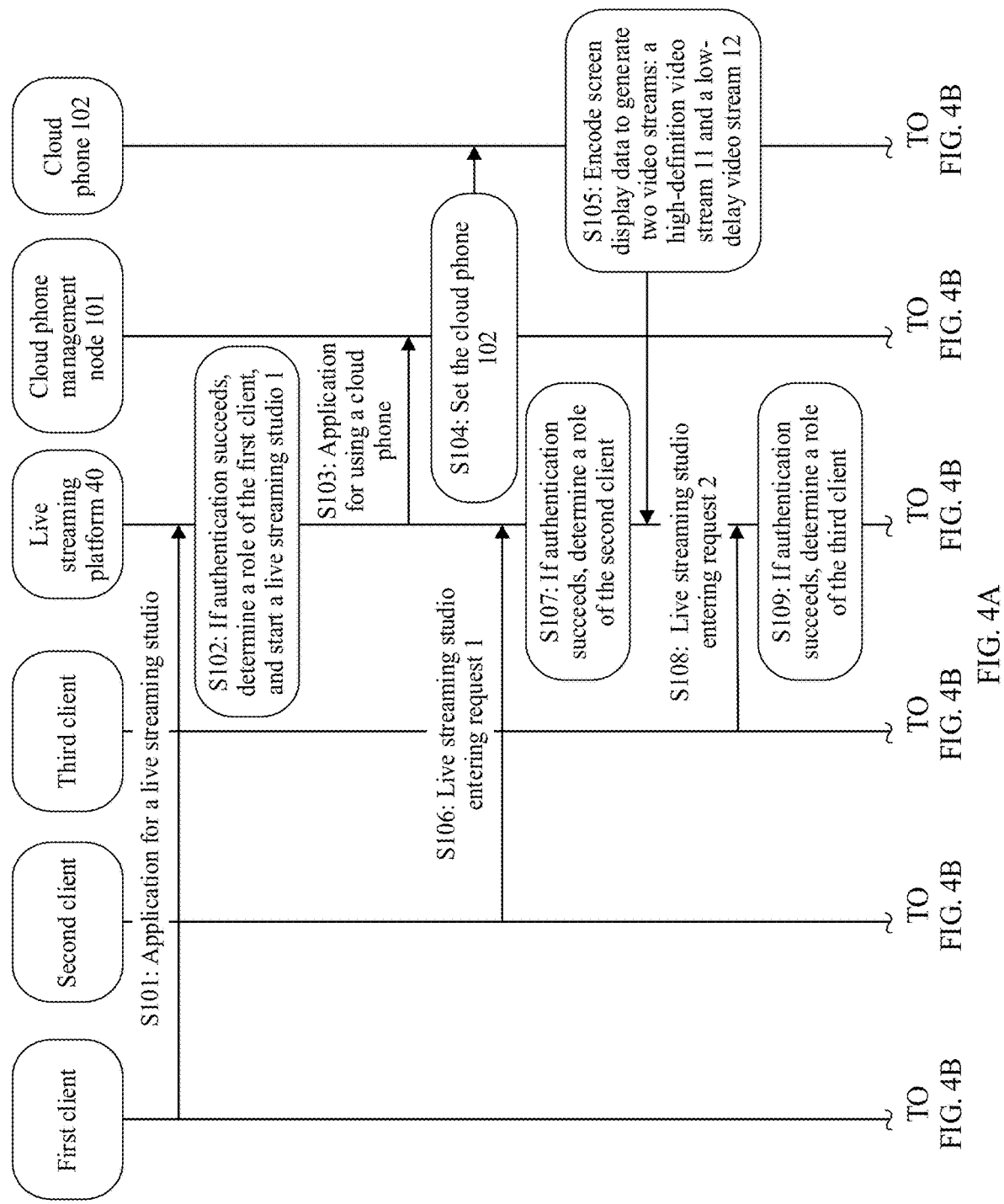
Figure 4B:
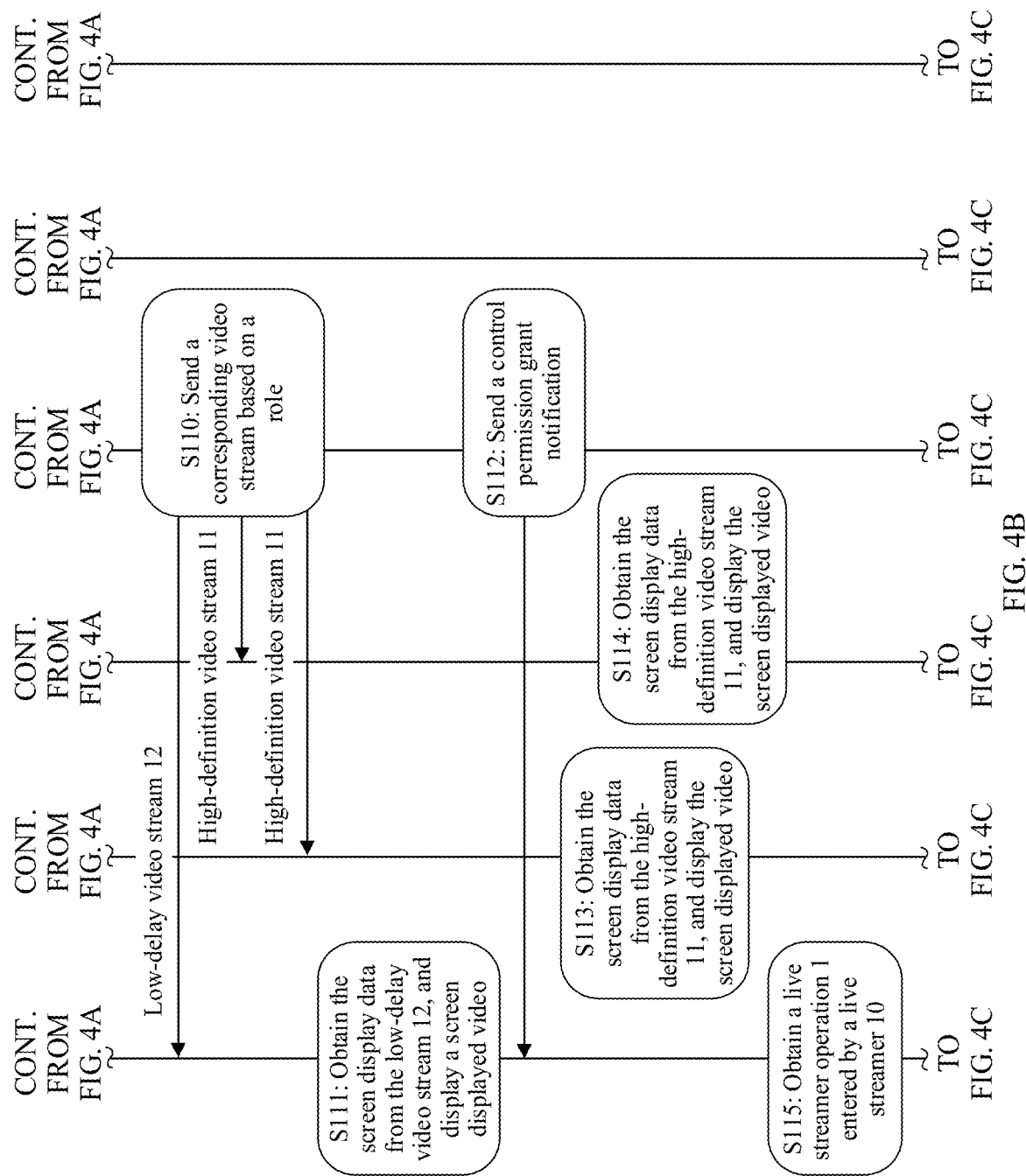
Figure 4C:
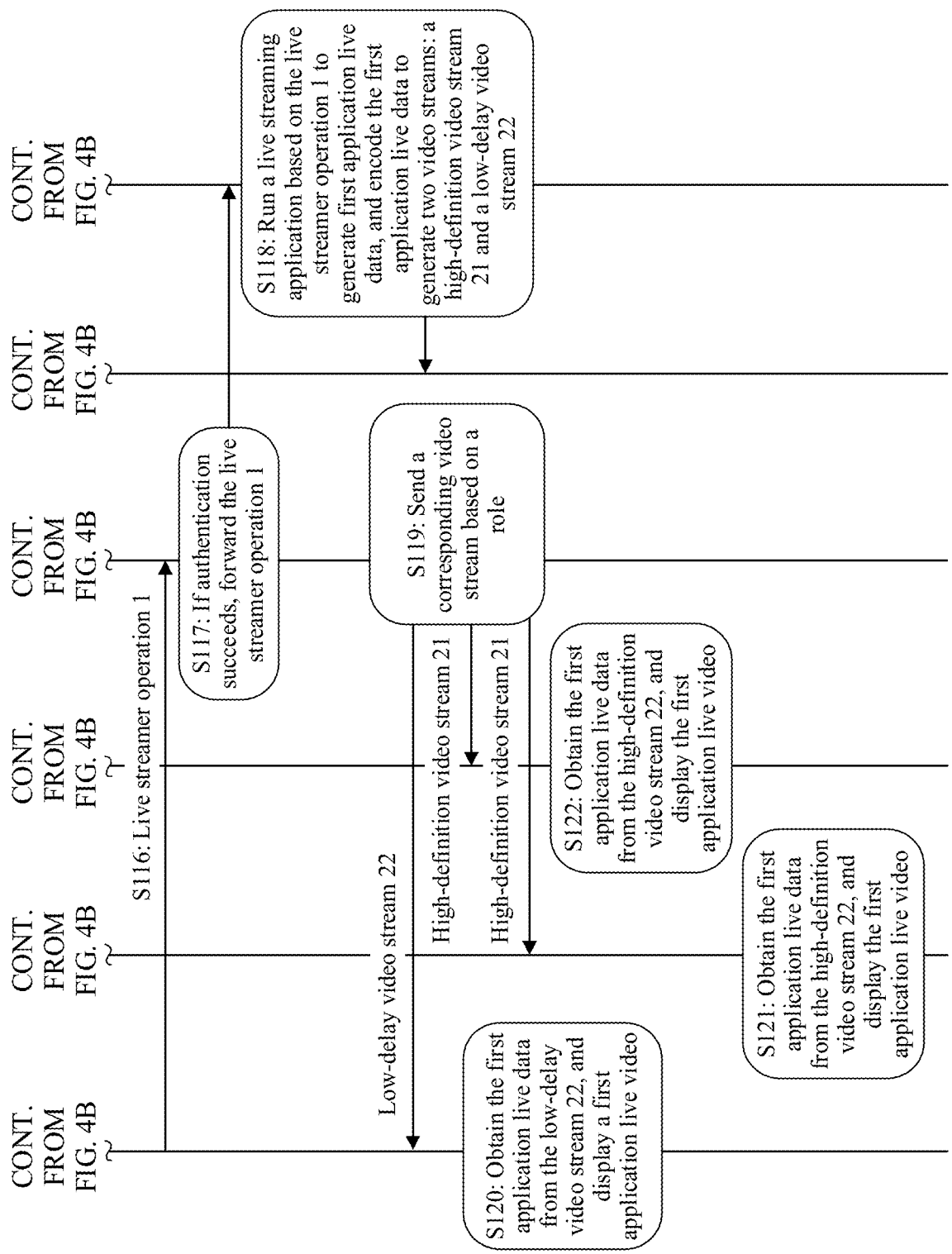

FIG. 4A to FIG. 4F are interaction diagrams of a live streaming method according to an embodiment of the present disclosure. First, as shown in FIG. 4A to FIG. 4C, the live streaming method in this embodiment of the present disclosure includes the following steps.

Step S101: A first client sends an application for a live streaming studio to the live streaming platform 40.

Refer to FIG. 5A to FIG. 5F together. FIG. 5A to FIG. 5F are schematic diagrams of screen displayed videos of the first terminal 20 according to an embodiment of the present disclosure.

Figure 5A:
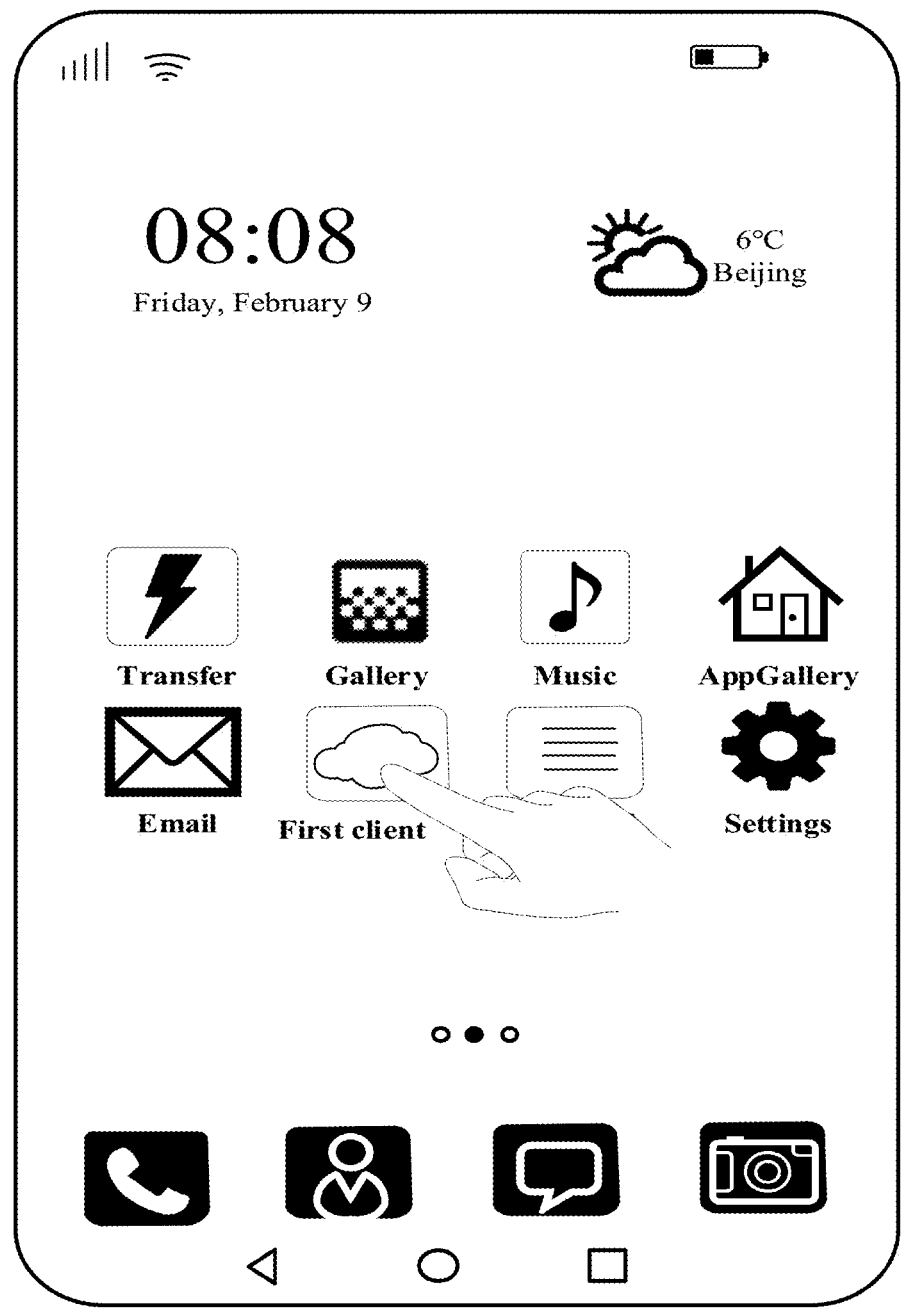
FIG. 5A to FIG. 5F are schematic diagrams of screen displayed videos of a first terminal according to an embodiment of the present disclosure.

As shown in FIG. 5A, an icon of the first client is set on a home screen of the first terminal 20. After the live streamer 10 taps the icon of the first client, the first client is started and establishes a connection to the live streaming platform 40. The first client generates a live streaming platform interface 1100, and displays the live streaming platform interface 1100 on the first terminal 20. The live streamer 10 may tap a "My account" icon displayed in the live streaming platform interface 1100, and enter an account and a password of the live streamer 10 to log in to the live streaming platform 40. The first client sends, to the live streaming platform 40 for verification, the account and the password that are entered by the live streamer 10. After the verification succeeds, the live streaming platform 40 notifies the first client that the verification succeeds.

After the verification succeeds, the live streamer 10 may further operate the first client, and tap a live streaming studio 1 provided by the first client, to trigger an application for the live streaming studio. In this case, the first client sends, to the live streaming platform 40, an application for a live streaming studio that carries an identifier of the live streaming studio 1 and the account of the live streamer 10.

Figure 5B:
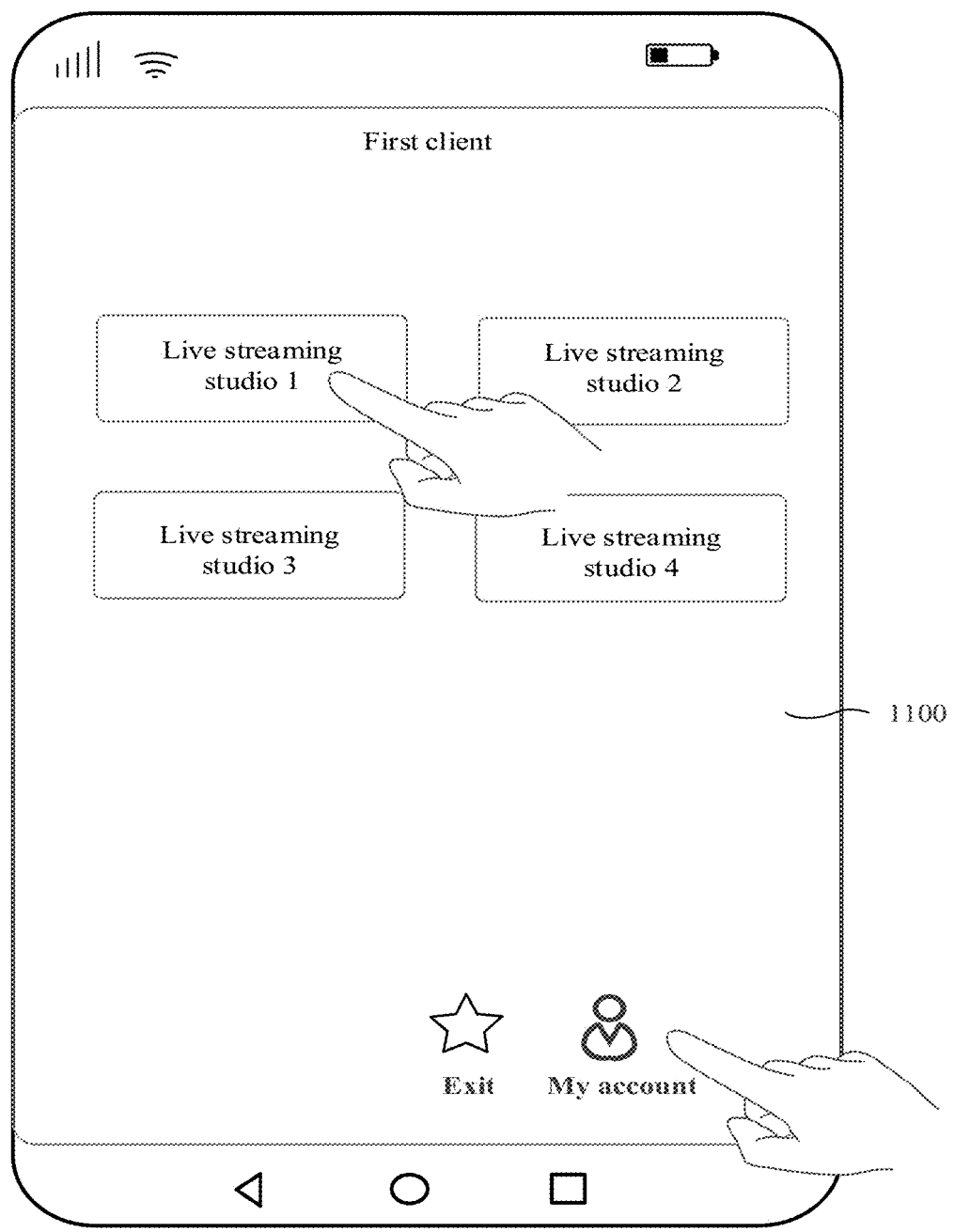
Figure 5C:
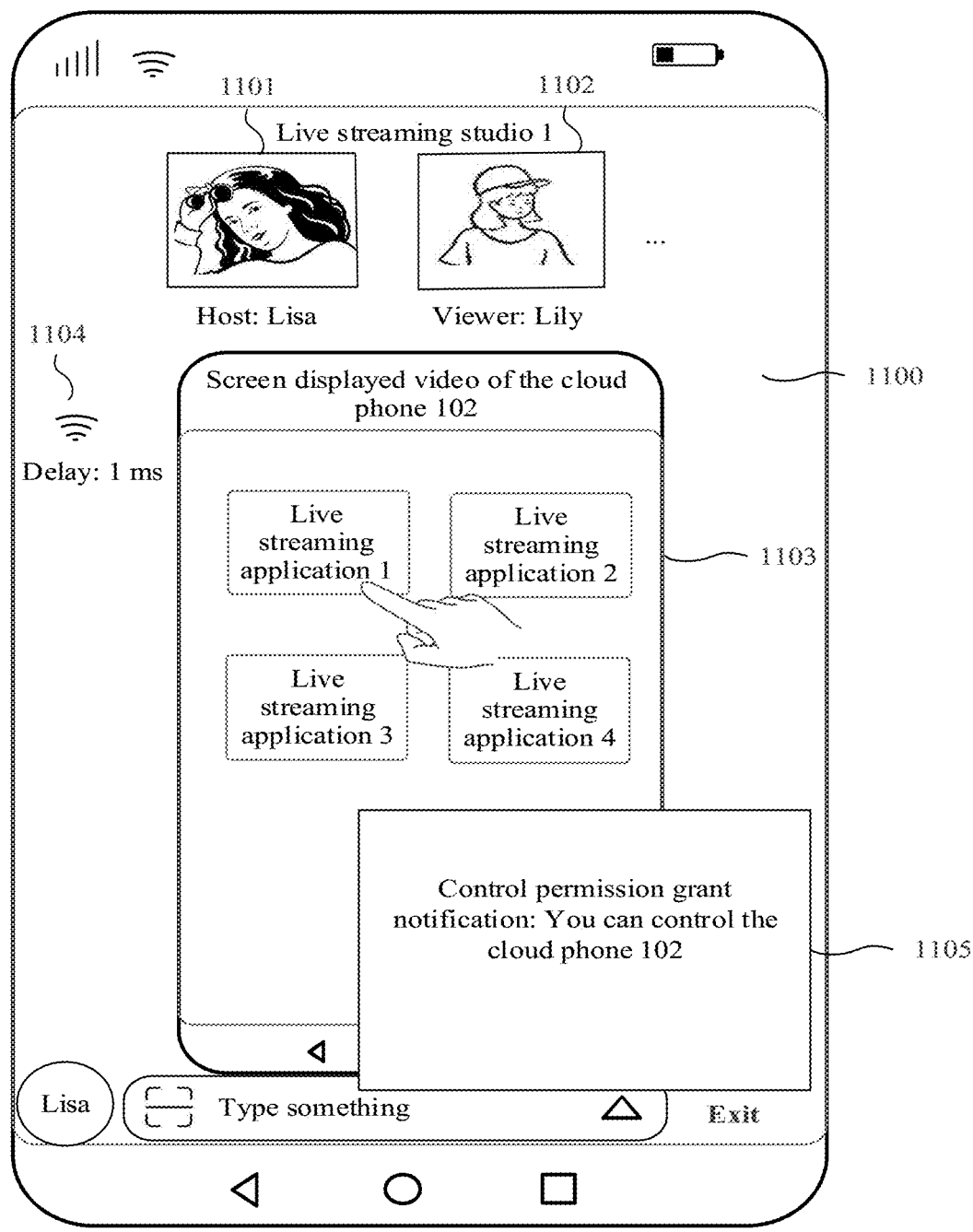

As shown in FIG. 5C, an account name of the live streamer 10 is Lisa.

The live streaming studio 1 can provide the live streaming applications 1 to 4, and a live streaming studio 2 can provide the live streaming application 5. When the live streamer 10 moves a finger to the live streaming studio 1, the first client may prompt that the live streaming studio 1 can provide the live streaming applications 1 to 4, and when the live streamer 10 moves a finger to the live streaming studio 2, the first client may prompt that the live streaming studio 2 can provide the live streaming application 5.

The identifier of the live streaming studio 1 may be, for example, a name that is set for the live streaming studio 1 by the live streamer 10, or a system default name.

Step S102: The live streaming platform 40 performs authentication on the application for a live streaming studio, to determine that the account of the live streamer 10 has been logged in to, starts the live streaming studio 1 on the live streaming platform 40 when the authentication succeeds, and records a role of the first client.

The live streaming platform 40 performs authentication on the account of the live streamer 10 carried in the application for a live streaming studio, to determine that the account of the live streamer 10 has been logged in to the live streaming platform 40, and records the role of the first client as a host of the live streaming studio 1.

Step S103: The live streaming platform 40 sends an application for using a cloud phone to the cloud phone management node 101.

The application for using a cloud phone carries identifiers of the live streaming applications 1 to 4.

Step S104: The cloud phone management node 101 sets the cloud phone 102 based on the application for using a cloud phone.

The cloud phone management node 101 may search the cloud phone resource pool 100 shown in FIG. 2 based on the identifiers that are of the live streaming applications 1 to 4 and that are carried in the application for using a cloud phone, select the cloud phone 102 on which the live streaming applications 1 to 4 are set, send a network address of the cloud phone 102 to the first client for recording, and set the cloud phone 102 to establish a connection to the live streaming platform 40.

Step S105: The cloud phone 102 encodes screen display data to generate two video streams: a high-definition video stream 11 and a low-delay video stream 12, and sends the two video streams to the live streaming platform 40.

The low-delay video stream 12 has a lower delay but poorer video quality than the high-definition video stream 11.

The screen display data is used to display a screen display interface of the cloud phone 102.

Step S106: A second client sends a live streaming studio entering request 1 to the live streaming platform 40.

Refer to FIG. 6A to FIG. 6F together. FIG. 6A to FIG. 6F are schematic diagrams of screen displayed videos of the second terminal 30 according to an embodiment of the present disclosure.

Figure 6A:
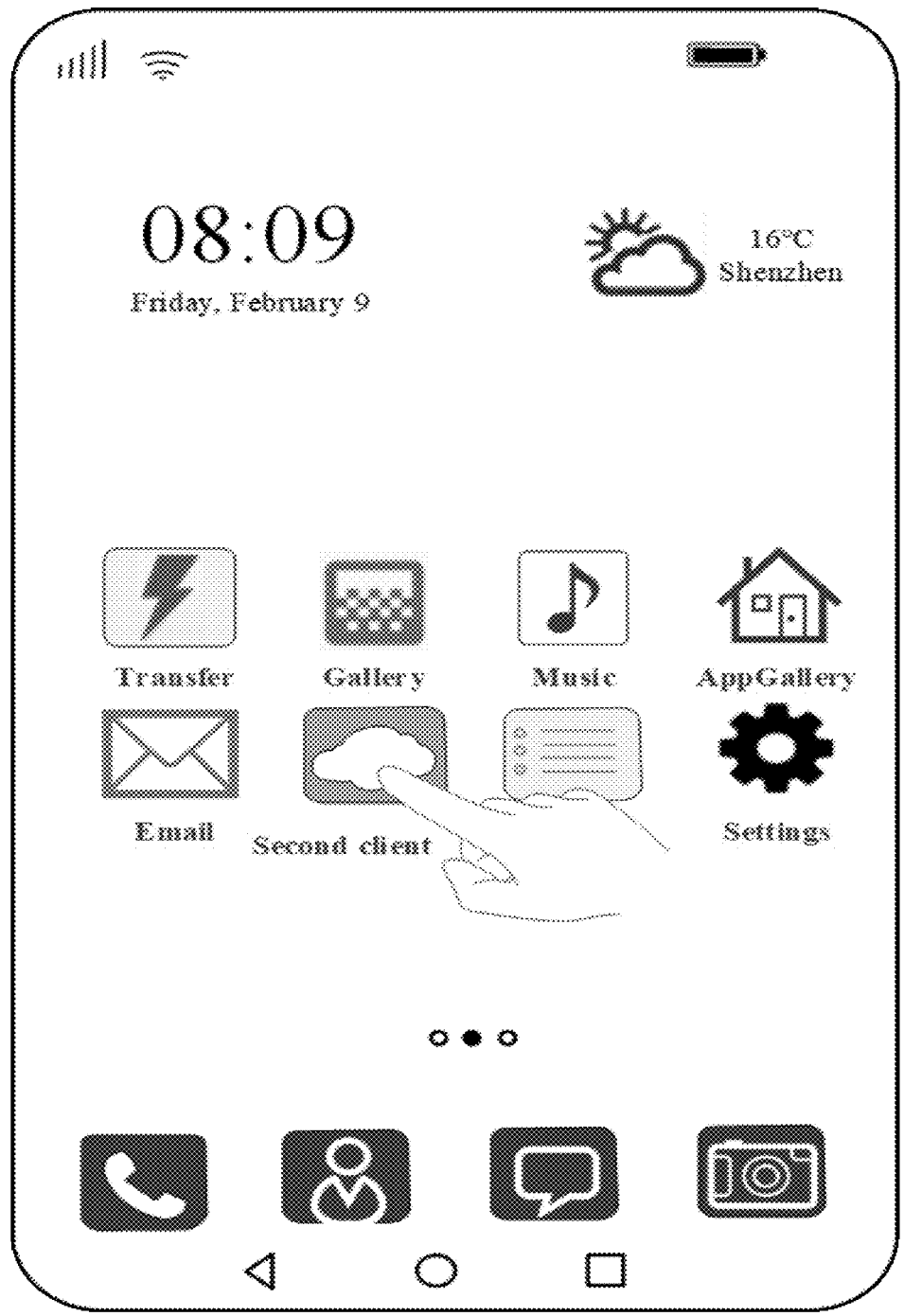
FIG. 6A to FIG. 6F are schematic diagrams of screen displayed videos of a second terminal according to an embodiment of the present disclosure.

As shown in FIG. 6*a*, an icon of the second client is set on a home screen of the second terminal 30. After the viewer 11 taps the icon of the second client, the second client is started and establishes a connection to the live streaming platform 40. The second client generates and displays a live streaming platform interface 2100 shown in FIG. 6*b*. The viewer 11 may tap a "My account" icon provided in the live streaming platform interface 2100, and enter an account and a password of the viewer 11 to log in to the live streaming platform 40. The second terminal 30 sends, to the live streaming platform 40 for verification, the account and the password that are entered by the viewer 11. After the verification succeeds, the live streaming platform 40 notifies the second terminal 30 that the verification succeeds.

As shown in FIG. 5*c*, the account of the viewer 11 is Lily.

After the verification succeeds, the viewer 11 may further tap an icon of the live streaming studio 1 provided in the live streaming platform interface 2100, to trigger the request for entering the live streaming studio. In this case, the second client sends, to the live streaming platform 40, the live streaming studio entering request 1 that carries the identifier of the live streaming studio 1 and the account of the viewer 11.

The live streaming studio 1 can provide the live streaming applications 1 to 4, and the live streaming studio can provide the live streaming application 5. When the viewer 11 moves a finger to the live streaming studio 1, a live streaming platform client may prompt that the live streaming studio 1 can provide the live streaming applications 1 to 4, and when the viewer 11 moves a finger to the live streaming studio 2, the live streaming platform client may prompt that the live streaming studio 2 can provide the live streaming application 5.

Step S107: The live streaming platform 40 performs authentication based on the live streaming studio entering request 1, to determine that the account of the viewer 11 is valid, that is, the authentication succeeds, and determines a role of the second client.

The live streaming platform 40 performs authentication on the account of the viewer 11 carried in the live streaming studio entering request 1, to determine that the account of the viewer 11 has been logged in to the live streaming platform 40, and records a role of a third client as a viewer of the live streaming studio 1 based on the account.

Step S108: A third client sends a live streaming studio entering request 2 to the live streaming platform 40.

Step S109: The live streaming platform 40 performs authentication based on the live streaming studio entering request 2, to determine that the account of the viewer 12 is valid, and determines that a role of the third client is a viewer of the live streaming studio 1.

It should be noted that steps S108 and S109 are similar to the foregoing steps S106 and S107. Details are not described herein again.

Step S110: The live streaming platform 40 sends a corresponding video stream to a client based on a role of the client that accesses the live streaming studio 1.

The live streaming platform 40 determines that the role of the first client is a host, sends the low-delay video stream 12 to the first client, determines that the role of the second client is a viewer, sends the high-definition video stream 11 to the second client, determines that the role of the third client is a viewer, and sends the high-definition video stream 11 to the third client.

Step S111: The first client receives the low-delay video stream 12, decodes the low-delay video stream 12 to obtain the screen display data of the cloud phone 102 that is carried in the low-delay video stream 12, and displays a screen displayed video of the cloud phone 102 on a local screen based on the screen display data.

After the live streamer 10 taps an option of the live streaming studio 1 in the live streaming platform interface 1100 shown in FIG. 5B, the first client enters the live streaming studio 1 after the foregoing steps, and updates and displays the live streaming platform interface 1100. For details, refer to FIG. 5C. The first client displays a screen displayed video 1103 of the cloud phone 102 in the live streaming platform interface 1100, and icons of the live streaming applications 1 to 4 are displayed on the screen displayed video 1103.

In addition, an icon 1104 is further displayed in the live streaming platform interface 1100. The icon indicates a delay, for example, 1 millisecond (ms), of the screen displayed video of the cloud phone 102. The delay is obtained in a process of decoding the low-delay video stream 12 by the first client.

Step S112: The live streaming platform 40 sends a control permission grant notification to the first client.

The live streaming platform 40 sends the control permission grant notification to the first client based on the host role of the first client.

Further, after receiving the control permission grant notification, the first client prompts, in the live streaming platform interface 1100, that the live streamer 10 can control the cloud phone 102. For details, refer to a dialog box 1105 in FIG. 5C.

Therefore, the first client can obtain control permission for the cloud phone using the live streaming platform 40.

Step S113: The second client receives the high-definition video stream 11, decodes the high-definition video stream 11 to obtain the screen display data of the cloud phone 102, and displays a screen displayed video of the cloud phone 102 in the live streaming platform interface 2100 based on the screen display data.

Figure 6B:
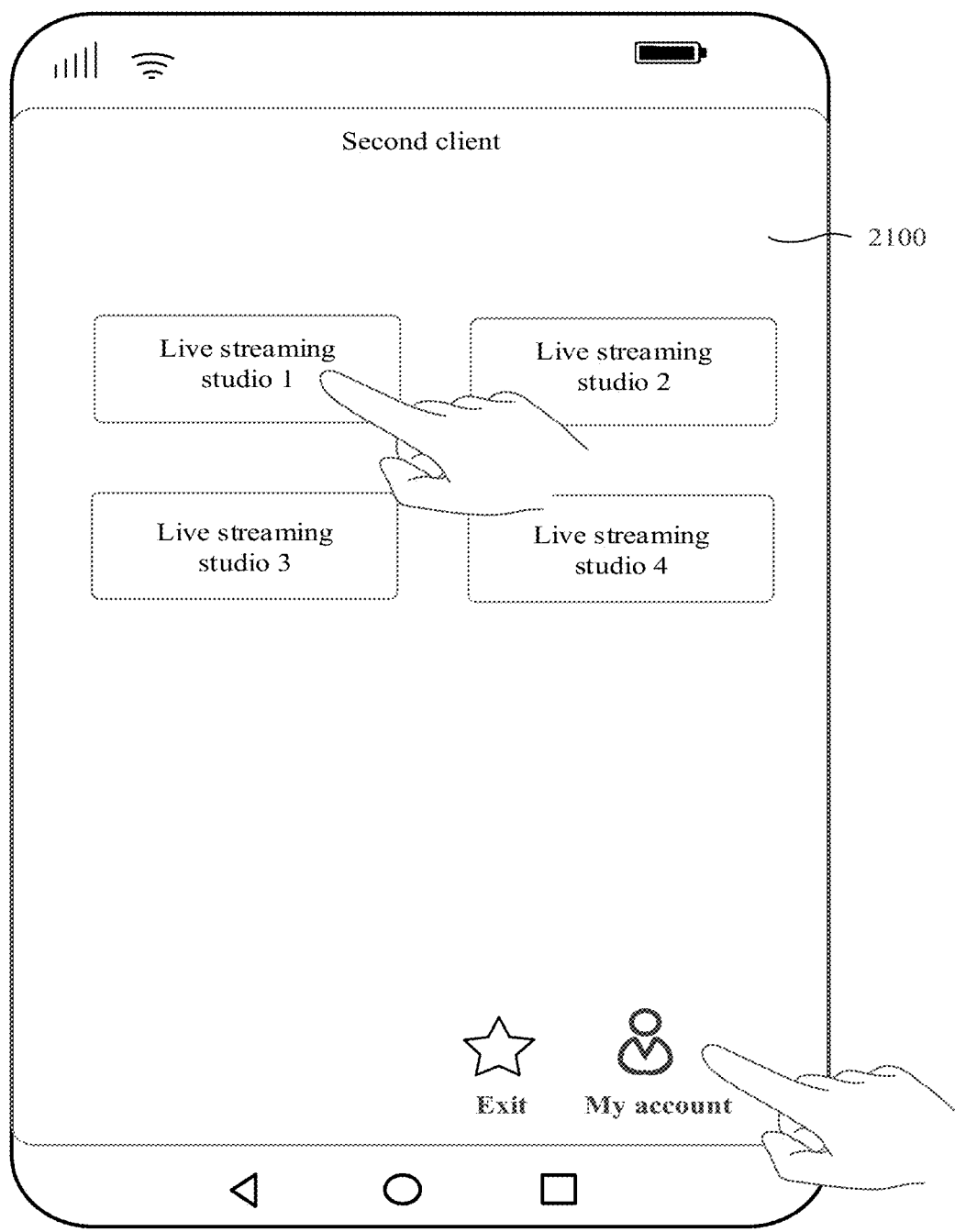
Figure 6C:
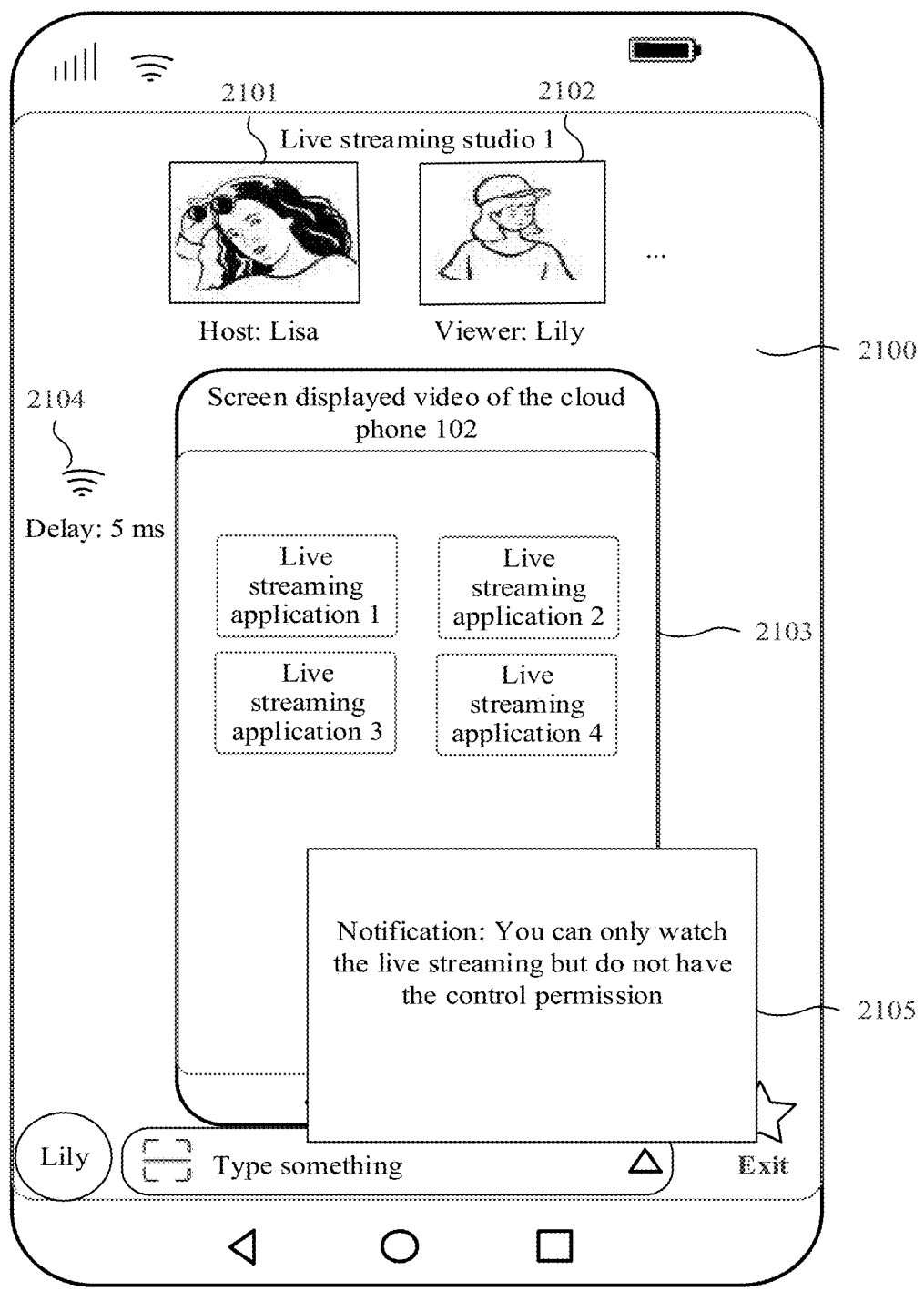

After the viewer 11 taps the icon of the live streaming studio 1 displayed in the live streaming platform interface 2100 in FIG. 6B, the live streaming platform interface 2100 is updated to that shown in FIG. 6C. For details, refer to FIG. 6C. The second client displays the screen displayed video of the cloud phone 102 in the live streaming platform interface 2100.

In addition, the second client displays an icon 2104 in the live streaming platform interface 2100. The icon indicates a delay, for example, 5 ms, of the screen displayed video of the cloud phone 102. The delay is obtained in a process of decoding the high-definition video stream 11, and is used to describe the delay of the screen displayed video.

Step S114: The third client receives the high-definition video stream 11, decodes the high-definition video stream 11 to obtain the screen display data of the cloud phone 102, and displays the screen displayed video of the cloud phone 102 in a live streaming platform interface based on the screen display data.

Optionally, the live streaming platform 40 may send a live streaming permission notification to the client. The live streaming platform 40 sends a live streaming permission notification to each of the second client and the third client. The live streaming permission notification is used to prompt that an operator of the client has no control permission for the cloud phone 102.

Further, after receiving the live streaming permission notification, the second client and the third client each may prompt, in the live streaming platform interface, that the viewer cannot control the cloud phone 102. For details, refer to a dialog box 2105 in FIG. 6C.

Because the delay of the low-delay video stream 12 is lower than that of the high-definition video stream 11, the live streaming platform 40 sends the low-delay video stream 12 to the first client, to ensure that a delay of the screen display data of the cloud phone 102 that is obtained by the first client from the low-delay video stream 12 is low, so that the live streamer 10 can see the screen displayed video of the cloud phone 102 in a timely manner, to ensure that no excessive delay is generated by an operation of the live streamer 10 on the cloud phone 102 for the screen displayed video. The high-definition video stream 11 is sent to the second client and the third client based on a fact that neither of the viewers needs to perform an operation on the cloud phone 102. Because a requirement for real-time performance of an operation is not high, an appropriate delay may be allowed, and video quality may be maintained.

Step S115: The first client obtains a live streamer operation 1 entered by the live streamer 10.

Figure 5D:
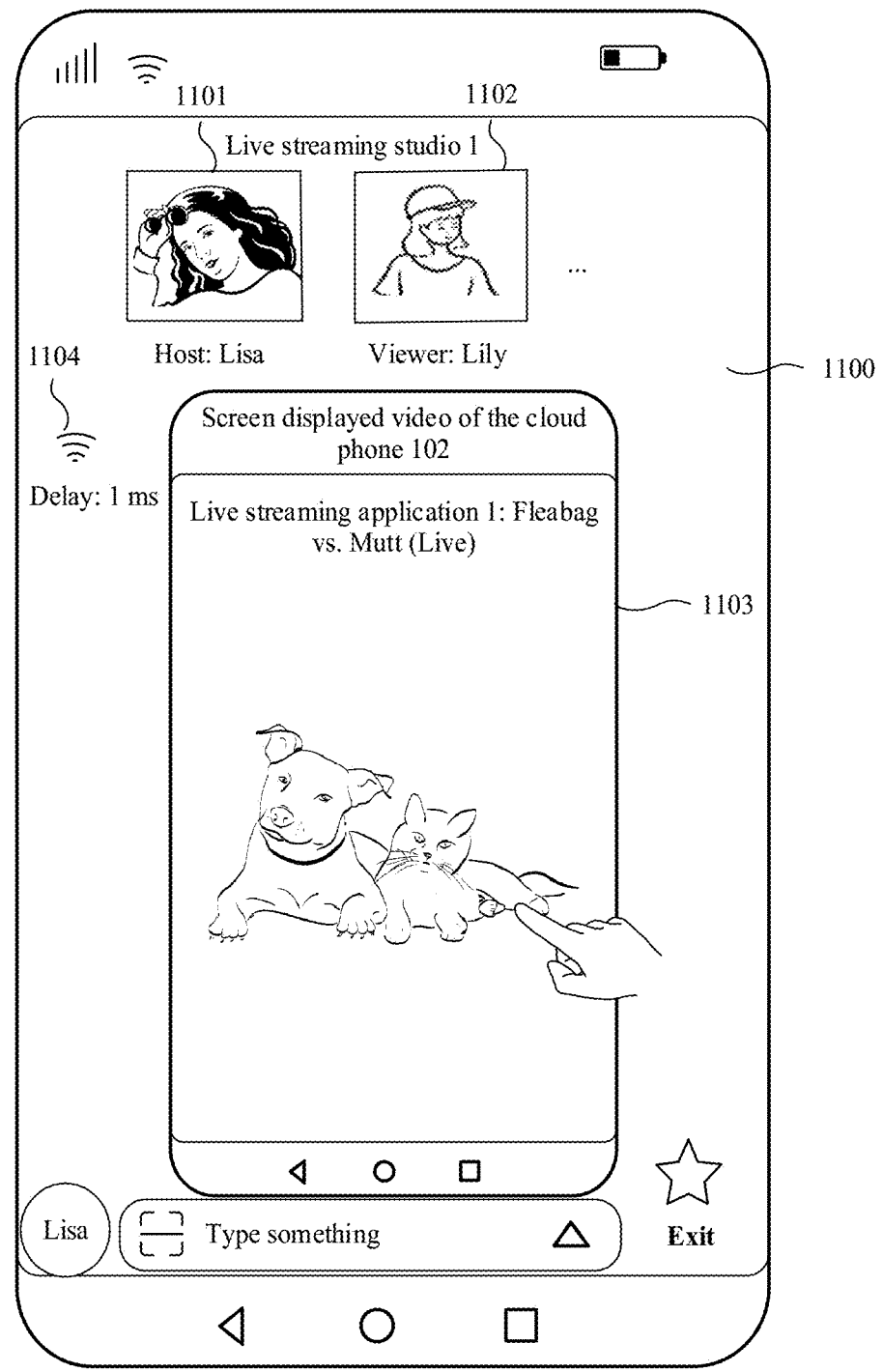

As shown in FIG. 5D, a touch action that is entered by the live streamer 10 on the screen displayed video 1103 of the cloud phone 102 may be converted by the first client into the live streamer operation 1. The live streamer operation 1 is a touch command, and the live streamer operation 1 is, for example, dragging a cat and dog icon in the game Fleabag vs. Mutt.

Step S116: The first terminal 20 sends the live streamer operation 1 to the live streaming platform 40.

Step S117: The live streaming platform 40 forwards a control flow 1 to the cloud phone 102 after authentication on the live streamer operation 1 succeeds.

The live streamer operation 1 may be sent together with the account of the live streamer 10, and the live streaming platform 40 performs authentication on the account.

In some other examples, the live streamer operation 1 may be sent together with a network address of the first terminal 20, and the live streaming platform 40 performs authentication on the network address.

Step S118: The cloud phone 102 runs the live streaming application 1 in the cloud phone 102 based on the live streamer operation 1 to generate first application live data, encodes the first application live data to generate two video streams: a high-definition video stream 21 and a low-delay video stream 22, and sends the two video streams to the live streaming platform 40.

Step S119: The live streaming platform 40 sends a corresponding video stream to a client based on a role of the client.

The live streaming platform 40 determines that the role of the first client is a host, sends the low-delay video stream 22 to the first client, determines that the role of the second client is a viewer, sends the high-definition video stream 21 to the second client, determines that the role of the third client is a viewer, and sends the high-definition video stream 21 to the third client.

Step S120: The first client receives the low-delay video stream 22, decodes the low-delay video stream 22 to obtain the first application live data, and displays a first application live video 1103 in the live streaming platform interface 1100 based on the first application live data.

As shown in FIG. 5C, the first client displays the first application live video 1103 in the live streaming platform interface 1100 based on the first application live data.

In this step, the first application live video 1103 is displayed in the live streaming platform interface 1100. Optionally, the first application live video 1103 may be scaled up through an operation of the live streamer 10, to cover the entire live streaming platform interface 1100.

In addition, the icon 1104 is further set in the live streaming studio 1 displayed on the first terminal 20. The icon indicates a delay, for example, 1 ms, of the screen displayed video of the cloud phone 102. The delay is obtained in a process of decoding the low-delay video stream 12.

Step S121: The second client receives the high-definition video stream 21, decodes the high-definition video stream 21 to obtain the first application live data, and displays a first application live video 2103 in the live streaming platform interface 2100 based on the first application live data. For details, refer to FIG. 6C.

Step S122: The third client receives the high-definition video stream 21, decodes the high-definition video stream 21 to obtain the first application live data, and displays the first application live video 2103 in the live streaming platform interface of the third client based on the first application live data.

Therefore, in the foregoing embodiment, the screen displayed video of the cloud phone 102 is played in the live streaming studio 1. The first client that accesses the live streaming studio 1 displays the screen displayed video to the live streamer 10. The live streamer 10 performs an operation on a screen of the first terminal 20 based on the screen displayed video. The generated live streamer operation is forwarded by the live streaming platform 40 to the cloud phone 102. The cloud phone 102 operates the live streaming application 1 based on the live streamer operation, and generates the first application live data. The first application live data is separately sent to the first client, the second client, and the third client using the live streaming platform. The live streamer 10, the viewer 11, and the viewer 12 can watch the first application live video of the cloud phone 102 using the live streaming studio 1. In this way, multi-person live streaming is implemented.

Because generation of the first application live data, encoding of the video stream, and sending of the first application live data are all performed on the cloud phone 102, the first terminal 20 in which the first client is located does not need to perform video rendering and video stream encoding, and a step of uploading the first application live data by the first terminal 20 to the live streaming platform 40 is omitted. In a live streaming process, there is no need to use rendering and video encoding capabilities of the first terminal 20 and upload bandwidth.

In some examples, the live streaming platform 40 may configure a hardware specification of the cloud phone 102 based on an account level of the live streamer 10. A higher level indicates a higher specification of the cloud phone 102, and a higher specification of the cloud phone 102 indicates more fluent video rendering and video stream encoding. In addition, upload bandwidth of the cloud phone 102 may be provided by the data center 200, and the upload bandwidth may be bound to the account level of the live streamer 10. A higher level indicates larger upload bandwidth.

In some other examples, the data center 200 may provide an interface such that the live streamer 10 purchases a hardware specification and upload bandwidth of the cloud phone 102 by accessing the interface.

Figure 4D:
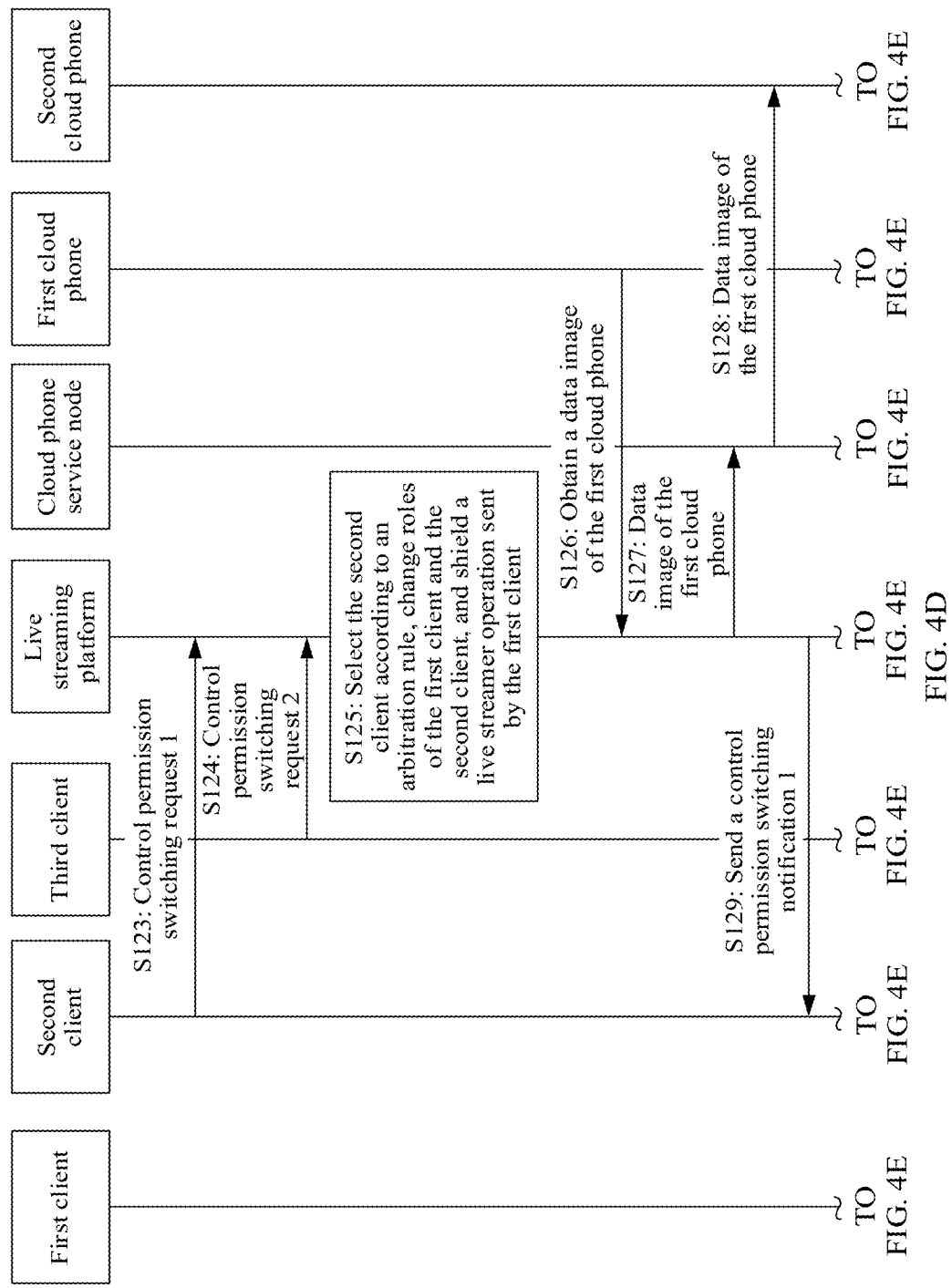
Figure 4F:
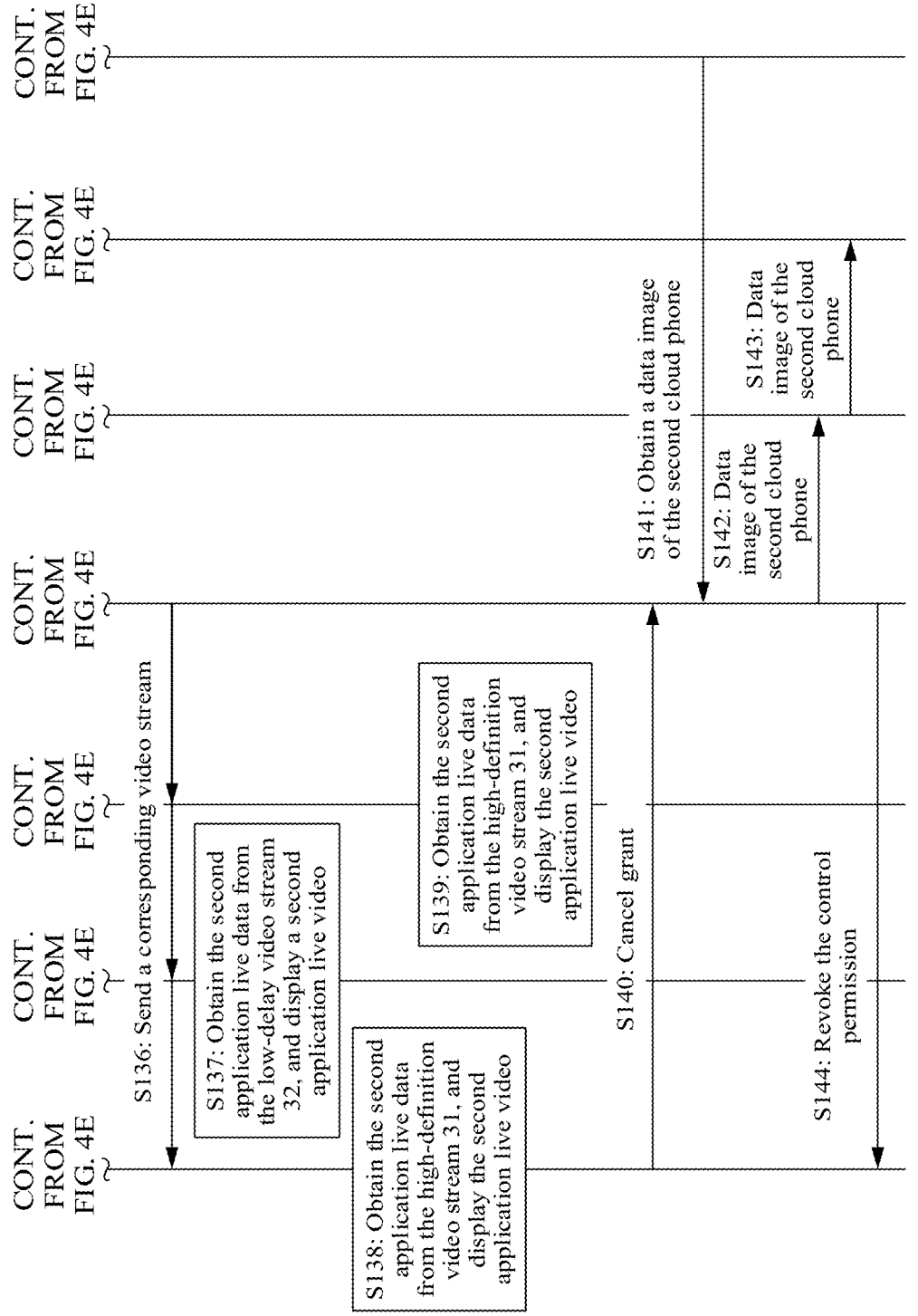

According to embodiments of the present disclosure, a function of switching the control permission for the cloud phone in the live streaming process is further supported. The live streaming platform 40 may revoke the control permission of the first client for the cloud phone 102 based on a control permission switching request, and grant the control permission for the cloud phone 102 to the second client. With reference to FIG. 4D to FIG. 4F that follows FIG. 4A to FIG. 4C, the cloud phone 102 in FIG. 4D to FIG. 4F includes a first cloud phone and a second cloud phone, where the first cloud phone is in a first region, the second cloud phone is in a second region, the first client is in the first region, and the second client is in the second region. As shown in FIG. 4D to FIG. 4F, the live streaming method according to embodiments of the present disclosure further includes the following steps.

Step S123: The second client sends a control permission switching request 1 to the live streaming platform 40.

Figure 6D:
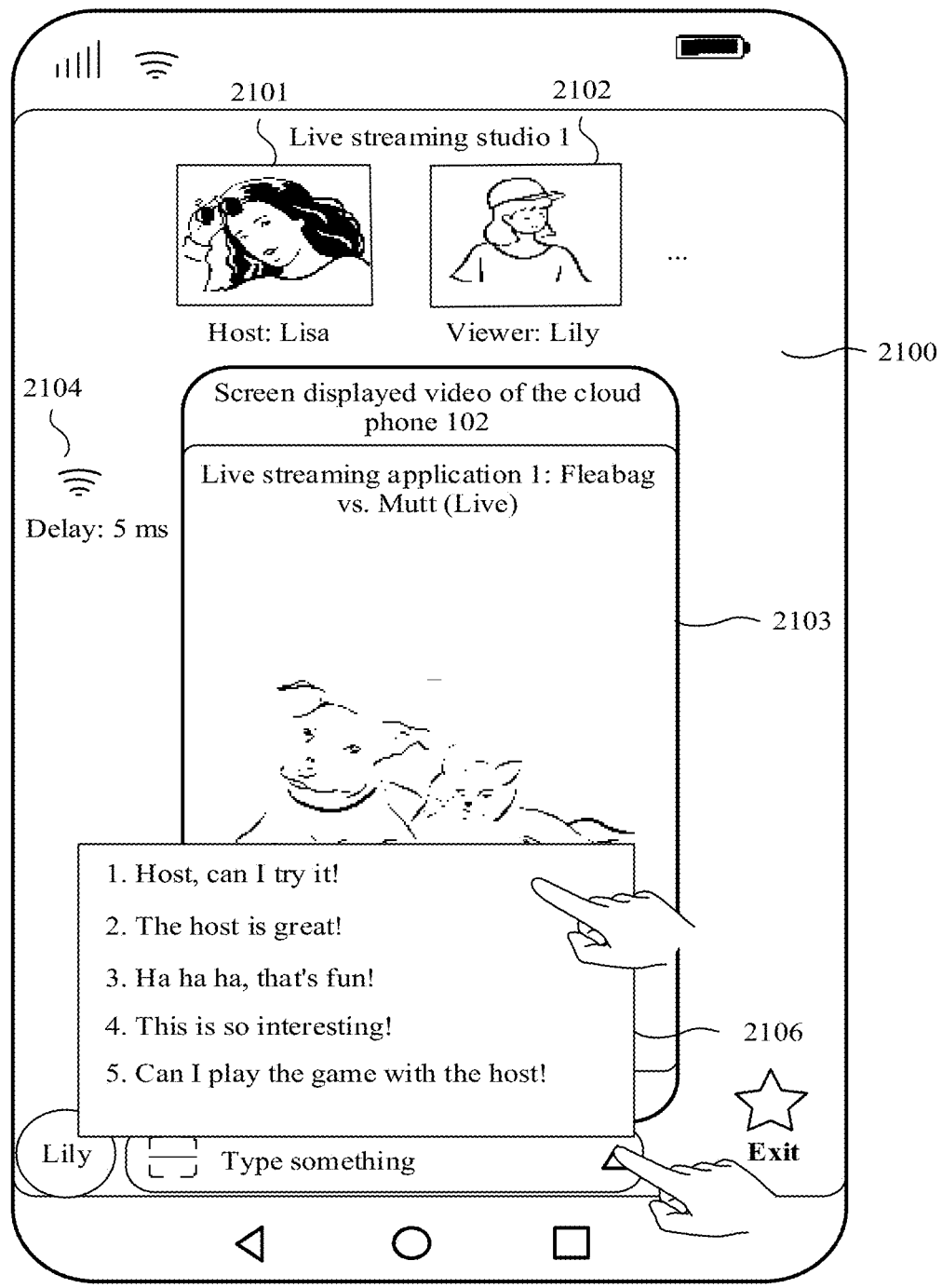

For example, as shown in FIG. 6D, in a process of watching the live streaming, the viewer 11 may tap an input box of "type something" in the live streaming platform interface 2100 provided by the second client. In this case, a dialog box 2106 is popped up. A plurality of options is set in the dialog box 2106, and a control permission switching option 1 in the dialog box 2106 is used to trigger the second client to send the control permission switching request 1 to the live streaming platform 40.

When the viewer 11 taps the control permission switching option 1, the second client sends the control permission switching request 1 to the live streaming platform 40.

Step S124: The third client sends an exclusive control permission switching request 2 to the live streaming platform 40.

When the second client sends the control permission switching request 1 to the live streaming platform 40, the third client also sends the exclusive control permission switching request 2 to the live streaming platform 40.

Step S125: The live streaming platform 40 selects the second client from the second client and the third client according to an arbitration rule, changes roles of the first client and the second client, and shields a live streamer operation sent by the first client.

The live streaming platform 40 changes the role of the first client from a host to a viewer, and changes the role of the second client from a viewer to a host.

For example, the arbitration rule may include: random selection, selection based on a level of an account used by a viewer to log in to the live streaming platform 40 (a higher level has a higher priority than a lower level), and bidding (a higher bidder is preferably selected).

In addition, the arbitration rule may be preset by the live streaming platform 40, or may be set by the live streamer 10 in the first client and sent to the live streaming platform 40 for recording.

In this step, after selecting the second client, the live streaming platform 40 may further send a control permission transfer request to the first client, where the control permission transfer request is used to request the first client to transfer the control permission for the cloud phone 102 to the second client. After receiving the control permission transfer request, the first client displays, in the live streaming platform interface of the first client, an option of whether to transfer the control permission to the second client. When the live streamer 10 chooses to transfer the control permission to the second client, the first client sends a control permission transfer confirmation to the live streaming platform 40. After receiving the control permission transfer confirmation, the live streaming platform 40 performs the foregoing actions of changing the role of the first client from a host to a viewer, changing the role of the second client from a viewer to a host, and shielding a live streamer operation sent by the first client. If receiving no control permission transfer confirmation, the live streaming platform 40 does not perform the foregoing actions.

Figure 5E:
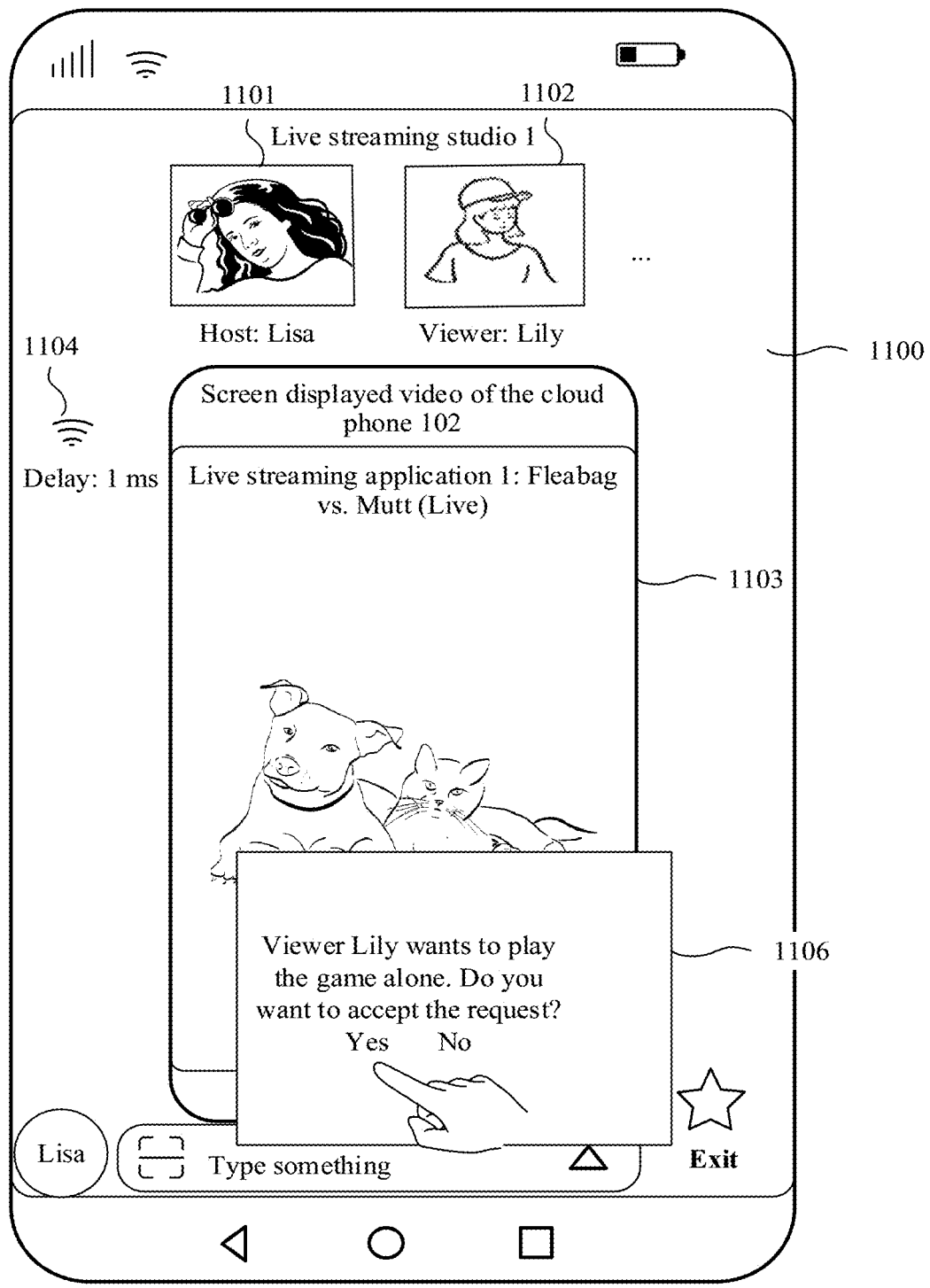

For example, after the first client receives the control permission transfer request, a dialog box 1106 shown in FIG. 5E is displayed in the live streaming platform interface 1100, and an option is provided. If the live streamer 10 taps "Yes", the first client sends a control permission switching confirmation for the control permission transfer request.

After the second client is selected, the live streaming platform 40 updates and records the role of the viewer 11 as a host, records the role of the live streamer 10 as a viewer, and shields a live streamer operation sent by the first client. The shielding means that the live streamer operation is not forwarded to the cloud phone 102.

In this embodiment, step S124 and step S125 are optional steps. In other words, when not both clients send control permission switching requests to the live streaming platform, if the live streaming platform receives the control permission switching request sent by only the second client, the live streaming platform directly performs a corresponding operation based on the control permission switching request of the second client.

Step S126: The live streaming platform 40 obtains a data image of the first cloud phone.

After the live streaming platform 40 obtains the control permission switching request of the second client, the live streaming platform 40 first determines whether the second client and the first client are in a same region. If the live streaming platform 40 determines that the second client and the first client are not in a same region, the live streaming platform 40 obtains data of the first cloud phone and generates the data image of the first cloud phone.

In an actual application process, the live streaming platform 40 may alternatively determine, using another condition, whether the data image of the first cloud phone needs to be obtained. For example, the live streaming platform 40 may alternatively determine, by determining real-time network conditions of the first client and the second client, whether the data image of the first cloud phone needs to be obtained. It may be understood that an operation of obtaining the data image of the first cloud phone may be triggered using another condition. This is not limited herein.

Step S127: The live streaming platform 40 sends the data image of the first cloud phone to a cloud phone management node for backup.

After the live streaming platform 40 obtains the data image of the first cloud phone, the live streaming platform 40 sends the data image of the first cloud phone to the cloud phone management node for backup. After receiving the data image of the first cloud phone, the cloud phone management node sends a backup of the data image of the first cloud phone to a cloud phone management node in the second region in which the second client is located. The data image of the first cloud phone is a running environment of the first cloud phone.

Step S128: The cloud phone management node creates the second cloud phone in the second region based on the data image of the first cloud phone.

The cloud phone management node in the second region in which the second client is located creates the second cloud phone in the second region based on the backup of the data image of the first cloud phone. That the second cloud phone is created in the second region may mean that a new cloud phone is generated, and the data image of the first cloud phone is backed up to the new cloud phone, or may mean that the data image of the first cloud phone is updated to an existing cloud phone. This is not limited herein. The second cloud phone establishes a connection to the second client. In other words, an operation on the second client generates a live video on the second cloud phone, and the live video is played.

Step S129: The live streaming platform 40 sends a control permission switching notification 1 to the second client, where the control permission switching notification 1 is used to notify the second client that the second client obtains the control permission for the cloud phone 102.

The second client prompts, based on the control permission switching notification 1, the viewer 11 that the viewer 11 obtains the control permission for the cloud phone 102.

Figure 6E:
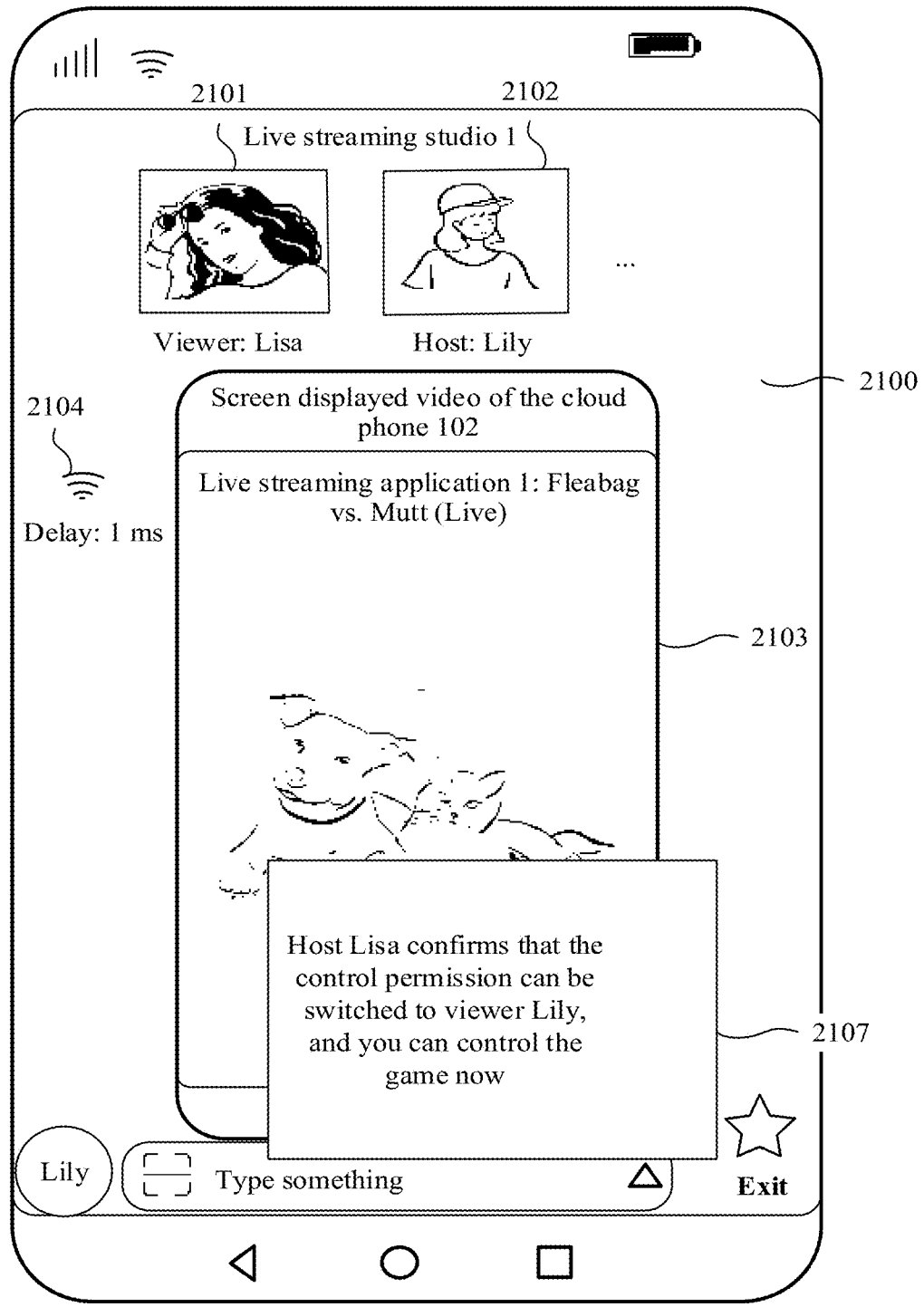

For example, as shown in FIG. 6E, the second client pops up a dialog box 2107 in the live streaming platform interface 2100, to notify the viewer 11 that the viewer 11 can start to control the live streaming application 1.

Step S130: The live streaming platform 40 sends a control permission switching notification 2 to the first client, where the control permission switching notification 2 is used to notify the first client that the first client loses the control permission for the cloud phone 102.

The first client prompts, based on the control permission switching notification 2, the live streamer 10 that the live streamer 10 loses the control permission for the cloud phone 102.

Figure 5F:
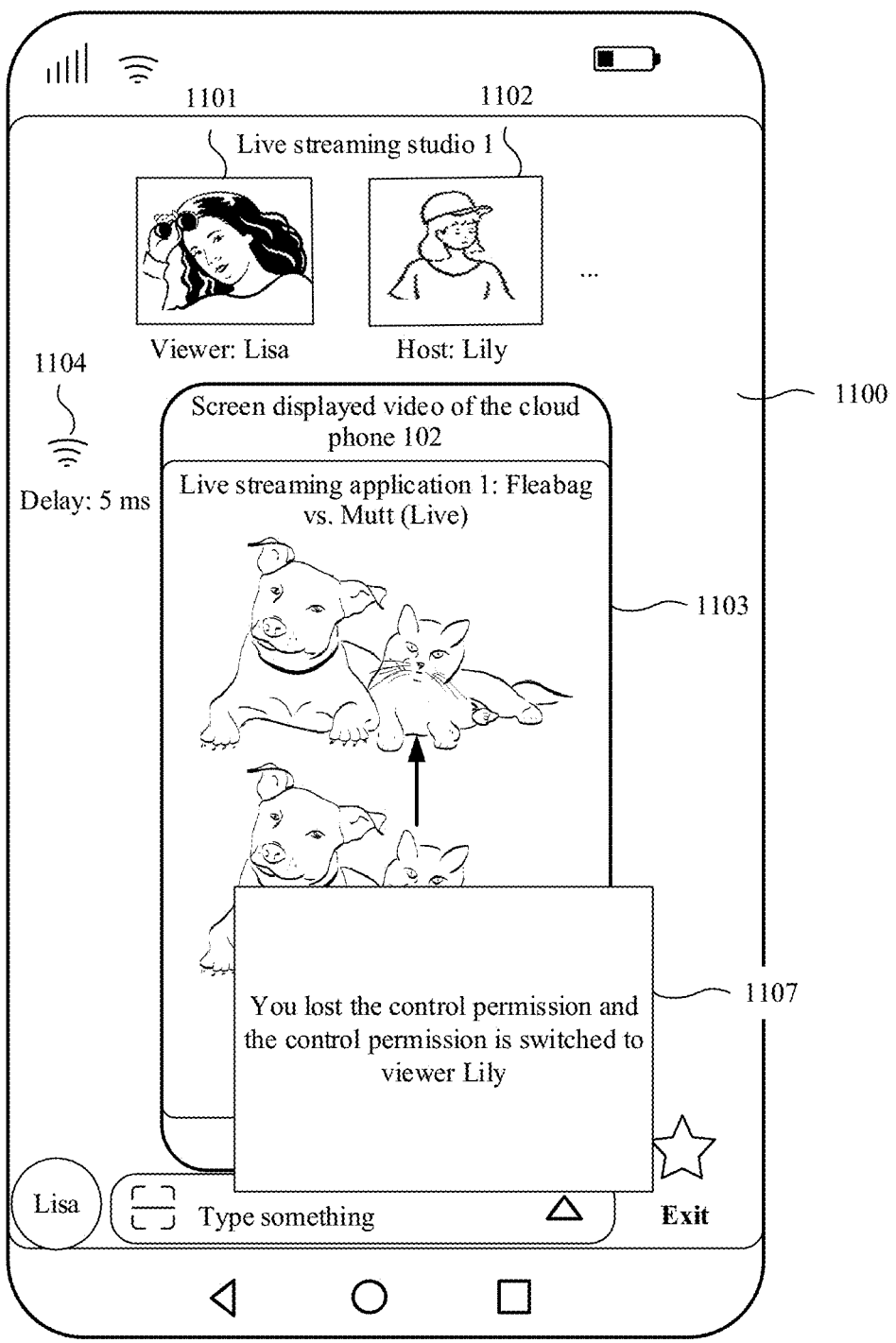

For example, as shown in FIG. 5F, the first client pops up a dialog box 1107 in the live streaming platform interface 1100, to prompt the live streamer 10 that the control permission for the cloud phone 102 is switched to the account Lily corresponding to the second client.

The control permission switching notification 2 may include the account Lily.

Step S131: The second client obtains a viewer operation 2 entered by the viewer 11.

Figure 6F:
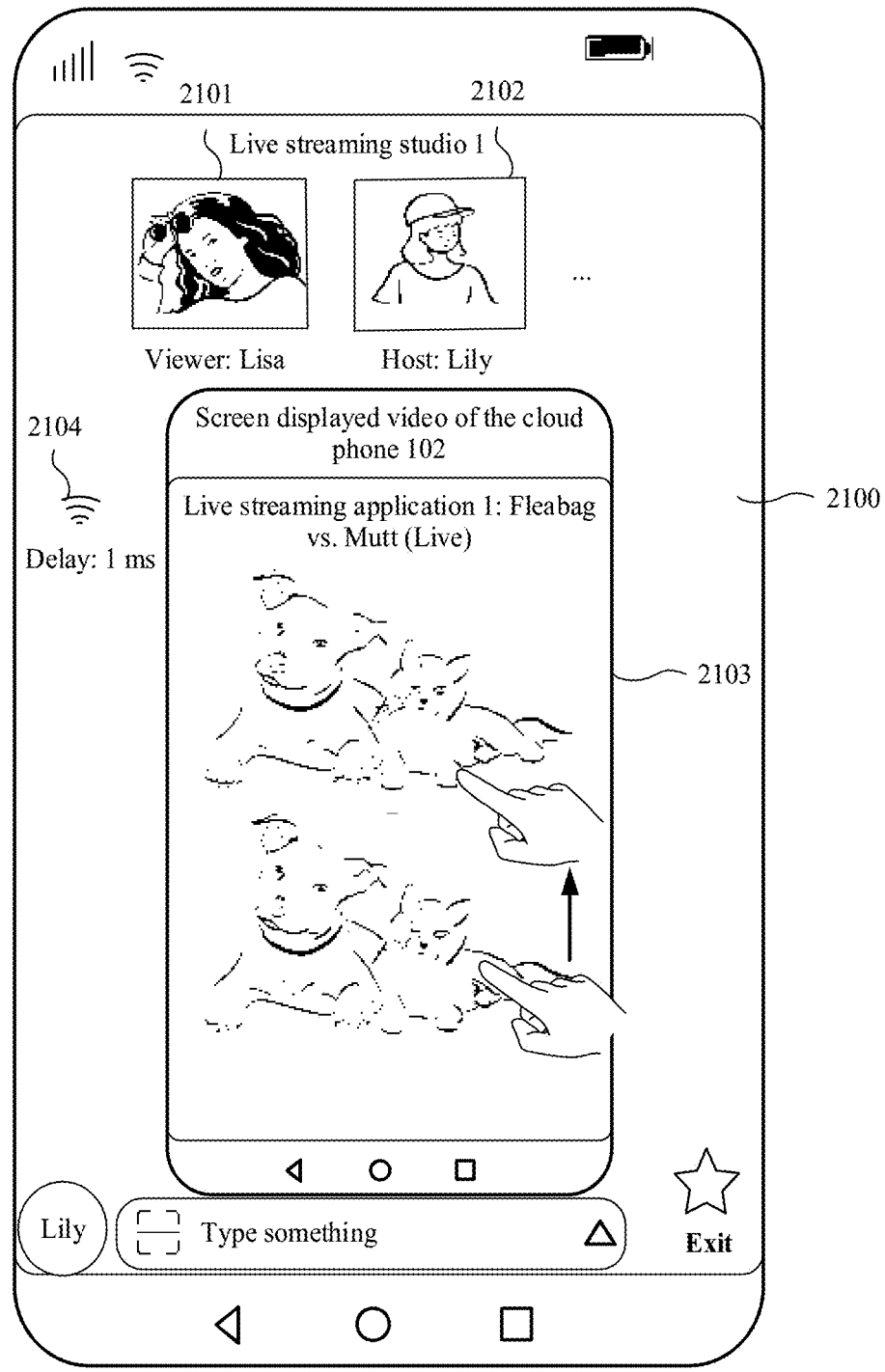

For example, as shown in FIG. 6F, the viewer 11 enters the viewer operation 2 on the screen displayed video of the cloud phone 102 in the live streaming platform interface 2100.

The viewer operation 2 is, for example, a touch action on the screen displayed video.

For example, as shown in FIG. 6F, the viewer operation 2 is, for example, dragging the displayed cat and dog upward.

Step S132: The second client sends the viewer operation 2 to the live streaming platform 40.

The viewer operation 2 may be sent together with the account of the viewer 11.

Step S133: The live streaming platform 40 successfully authenticates the viewer operation 2, and forwards the viewer operation 2 to the second cloud phone.

Step S134: The second cloud phone runs the live streaming application based on the viewer operation 2, so that the cat and dog icon is dragged upward, to generate second application live data that is used to render the upward dragging of the cat and dog icon, and encodes the second application live data to generate two video streams: a high-definition video stream 31 and a low-delay video stream 32.

Step S135: The second cloud phone sends, to the live streaming platform 40, the two video streams: the high-definition video stream 31 and the low-delay video stream 32.

Step S136: The live streaming platform 40 sends a corresponding video stream to a client based on a role of the client.

The live streaming platform 40 determines that the role of the second client is a host, sends the low-delay video stream 32 to the second client, determines that the role of the third client is a viewer, sends the high-definition video stream 31 to the third client, determines that the role of the first client is a viewer, and sends the high-definition video stream 31 to the first client.

Step S137: The second client receives the low-delay video stream 32, decodes the low-delay video stream 32 to obtain the second application live data, and displays a second application live video 2103 in the live streaming platform interface 2100 based on the second application live data.

As shown in FIG. 6f, the second client displays the second application live video 2103 in the live streaming platform interface 2100 based on the second application live data.

The second application live video 2103 shows a process of dragging the cat and dog icon upward.

Step S138: The first client receives the high-definition video stream 31, decodes the high-definition video stream 31 to obtain the second application live data, and displays the second application live video 2103 in the live streaming platform interface 2100 based on the second application live data. For details, refer to FIG. 6f.

Step S139: The third client receives the high-definition video stream 31, decodes the high-definition video stream 31 to obtain the second application live data, and displays the second application live video 2103 in the live streaming platform interface of the third client based on the second application live data.

Based on the foregoing steps, an operation process of a cloud phone application is played in the live streaming studio. When a viewer wants to participate in the live streaming, the viewer sends a request to the live streamer. The live streamer may give up the live streaming control permission, so that the viewer can operate the cloud phone and perform live streaming. In this way, the technical effect that the viewer participates in the live streaming is achieved, and live streaming experience of the viewer and the live streamer can be greatly improved.

Optionally, the control permission switching request may be actively triggered by the first client. The first client may display a viewer icon Lily in the live streaming platform interface 2100, and send the control permission switching request to the live streaming platform 40 when the viewer icon Lily is selected by the live streamer 10.

Therefore, the live streamer 10 may actively select the viewer 11 to control the cloud phone 102.

Still refer to FIG. 4D to FIG. 4F below. The live streaming method according to embodiments of the present disclosure further includes the following steps.

Step S140: The first client sends a grant cancellation request to the live streaming platform 40.

In this step, the grant cancellation request carries authentication information, for example, the account of the live streamer 10.

For example, the live streamer 10 may trigger, by tapping an "exit" button shown in FIG. 5f, the first client to send the grant cancellation request to the live streaming platform 40.

Step S141: The live streaming platform 40 obtains a data image of the second cloud phone based on the grant cancellation request.

In this step, the live streaming platform 40 performs this step after authentication based on the authentication information succeeds.

Step S142: The live streaming platform 40 sends the data image of the second cloud phone to the cloud phone management node for backup.

Step S143: The cloud phone management node creates the first cloud phone in the first region based on the data image of the second cloud phone, and synchronizes a real-time progress to the first cloud phone, where the first cloud phone is the cloud phone corresponding to the first client of the live streamer 10.

Step S144: The live streaming platform 40 sends a control permission revoking notification to the first client.

For example, other than a game application, the live streaming application 1 may alternatively be industrial design software, such as architectural design software or furniture customization software. Based on embodiments of the present disclosure, a designer and a customer may remotely interact with each other and discuss a design solution using the foregoing live streaming system.

Optionally, the live streaming application 1 may alternatively be document, image, or video playing software. In a medical solution discussion scenario, a doctor may perform remote medical consultation with another doctor using the live streaming application 1. Because a medical image has a large amount of data, a high processing performance requirement, and a high data security requirement, a corresponding data file cannot be directly transferred to a local terminal due to security and performance requirements, and a cloud phone needs to be used to meet a sharing and discussion requirement for the medical image.

In conclusion, the live streaming application may be any type of application, and embodiments of the present disclosure are applicable to different live streaming scenarios.

Figure 7:
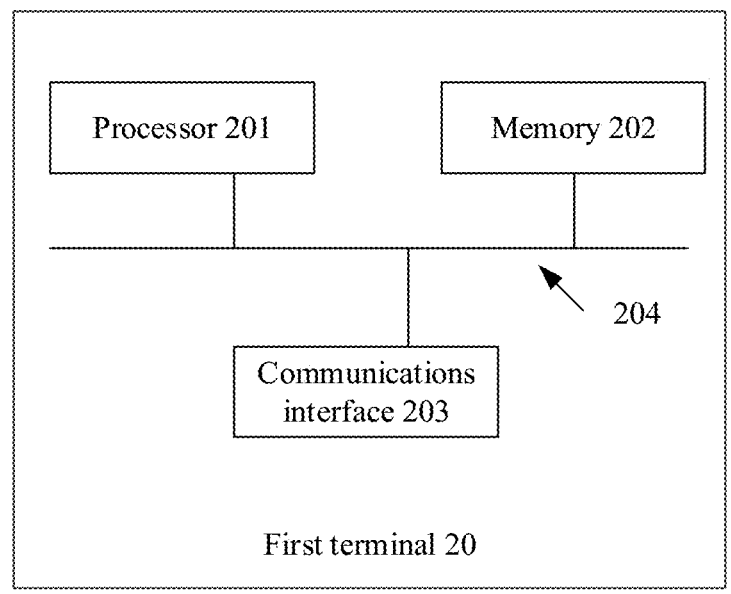
FIG. 7 is a schematic diagram of a hardware structure of a first terminal according to an embodiment of the present disclosure.

In the following, refer to FIG. 7 to FIG. 9. FIG. 7 is a schematic diagram of a hardware structure of a first terminal according to an embodiment of the present disclosure. As shown in FIG. 7, the first terminal 20 includes a processor 201, a memory 202, a communications interface 203, and a bus 204. The processor 201, the memory 202, and the communications interface 203 are separately connected to the bus 204. The memory 202 stores program instructions. The processor 201 runs the program instructions to implement a function of the first terminal 20.

Figure 8:
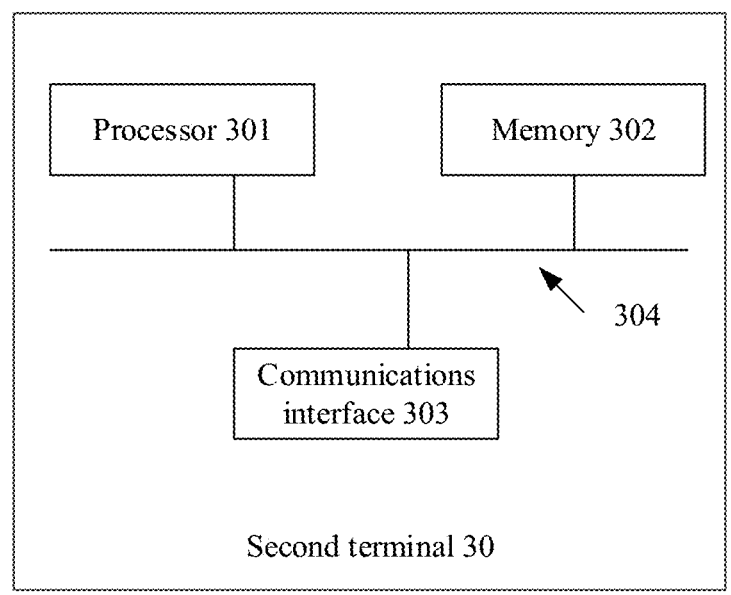
FIG. 8 is a schematic diagram of a hardware structure of a second terminal according to an embodiment of the present disclosure.

FIG. 8 is a schematic diagram of a hardware structure of a second terminal according to an embodiment of the present disclosure. As shown in FIG. 8, the second terminal 30 includes a processor 301, a memory 302, a communications interface 303, and a bus 304. The processor 301, the memory 302, and the communications interface 303 are separately connected to the bus 304. The memory 302 stores program instructions. The processor 301 runs the program instructions to implement a function of the second terminal 30.

Figure 9:
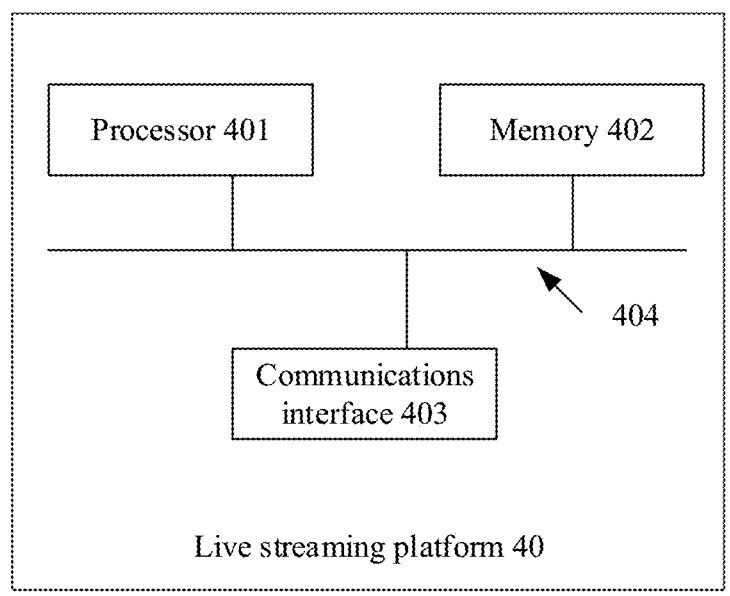
FIG. 9 is a schematic diagram of a hardware structure of a live streaming platform according to an embodiment of the present disclosure.

FIG. 9 is a schematic diagram of a hardware structure of a live streaming platform according to an embodiment of the present disclosure. As shown in FIG. 9, the live streaming platform 40 includes a processor 401, a memory 402, a communications interface 403, and a bus 404. The processor 401, the memory 402, and the communications interface 403 are separately connected to the bus 404. The memory 402 stores program instructions. The processor 401 runs the program instructions to implement a function of the live streaming platform 40. Optionally, the live streaming platform 40 may alternatively be implemented through a cluster.

Figure 10:
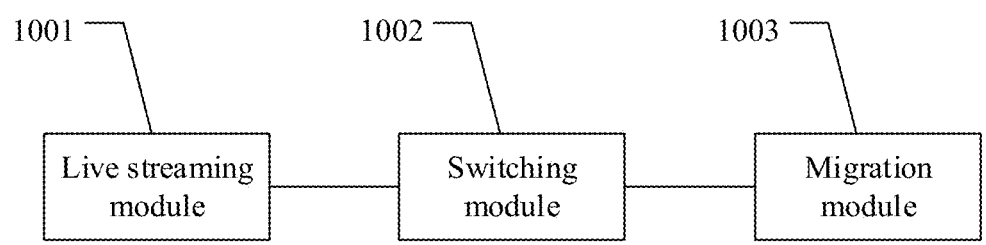
FIG. 10 is a schematic diagram of another hardware structure of a live streaming platform according to an embodiment of the present disclosure.

FIG. 10 is a schematic diagram of an apparatus structure of a live streaming platform according to an embodiment of the present disclosure. As shown in FIG. 10, the live streaming platform includes: a live streaming module 1001, configured to play a live video generated by a first cloud phone under control of a first client, where the first cloud phone and the first client are located in a first region, a switching module 1002, configured to switch control permission for the first cloud phone from the first client to a second client, and a migration module 1003, configured to migrate the first cloud phone to a second cloud phone online, where the second cloud phone and the second client are located in a second region.

The live streaming module 1001 is further configured to play a live video generated by the second cloud phone under control of the second client.

The method performed by the modules of the live streaming platform in this embodiment is similar to the method performed by the live streaming platform in the embodiments shown in FIG. 4A to FIG. 4F. Details are not described herein again.

Figure 11:
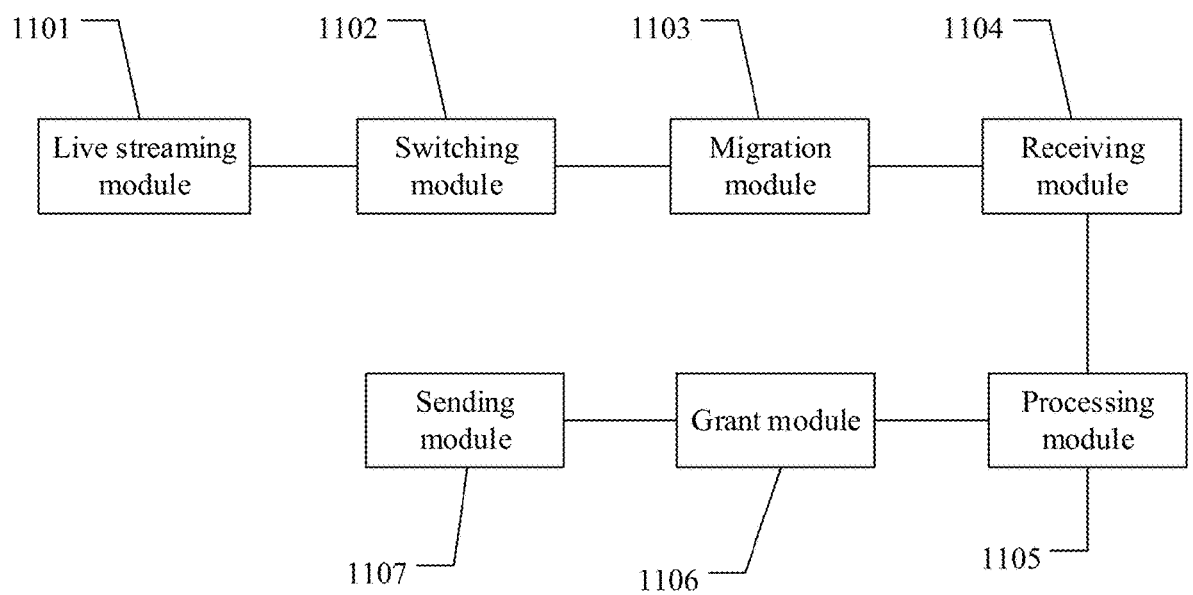
FIG. 11 is a schematic diagram of another hardware structure of a live streaming platform according to an embodiment of the present disclosure.

FIG. 11 is a schematic diagram of an apparatus structure of a live streaming platform according to an embodiment of the present disclosure. As shown in FIG. 11, the live streaming platform includes a live streaming module 1101 configured to play a live video generated by a first cloud phone under control of a first client, where the first cloud phone and the first client are located in a first region, a switching module 1102 configured to switch control permission for the first cloud phone from the first client to a second client, and a migration module 1103 configured to migrate the first cloud phone to a second cloud phone online, where the second cloud phone and the second client are located in a second region.

The live streaming module 1101 is further configured to play a live video generated by the second cloud phone under control of the second client.

Optionally, the live streaming platform further includes a receiving module 1104 configured to receive a control permission switching request sent by the first client, a processing module 1105 configured to revoke the control permission of the first client for the first cloud phone based on the control permission switching request, and a grant module 1106 configured to grant the control permission for the first cloud phone to the second client.

Optionally, the receiving module 1104 is further configured to receive a control permission switching request sent by the second client.

The switching module 1102 is further configured to forward the control permission switching request to the first client.

The receiving module 1104 is further configured to receive a switching confirmation request sent by the first client, where the switching confirmation request indicates that the first client agrees to switch the control permission for the first cloud phone from the first client to the second client.

The processing module 1105 is further configured to revoke the control permission of the first client for the first cloud phone based on the switching confirmation request.

The grant module 1106 is further configured to grant the control permission for the first cloud phone to the second client.

Optionally, the receiving module 1104 is further configured to receive a control instruction sent by the second client, where the control instruction is used to control the second cloud phone.

The processing module 1105 is further configured to generate a live video based on the control instruction.

The live streaming module 1101 is further configured to play the live video.

Optionally, the live streaming platform further includes a sending module 1107 configured to send a high-definition live video to the first client, where the high-definition live video is a live video whose definition is greater than a preset threshold. The sending module 1107 is further configured to send a low-delay live video to the second client, where the low-delay live video is a live video whose definition is less than the preset threshold.

The method performed by the modules of the live streaming platform in this embodiment is similar to the method performed by the live streaming platform in the embodiments shown in FIG. 4A to FIG. 4F. Details are not described herein again.

An embodiment of the present disclosure further provides a computer-readable storage medium, including instructions. When the instructions are run on a computing device, the computing device is enabled to perform the methods of the first client, the second client, or the first cloud phone and the second cloud phone.

Based on the description of the foregoing implementations, a person skilled in the art may clearly understand that this application may be implemented by software in addition to necessary universal hardware, or by dedicated hardware, including a dedicated integrated circuit, a dedicated central processing unit (CPU), a dedicated memory, a dedicated component, and the like. Generally, all functions implemented by a computer program can be easily implemented using corresponding hardware. In addition, a specific hardware structure used to implement a same function may be of various forms, for example, in a form of an analog circuit, a digital circuit, or a dedicated circuit. However, for this application, software program implementation is a better implementation in most cases. Based on such an understanding, the technical solutions of this application essentially or the part contributing to the conventional technology may be implemented in a form of a software product. The computer software product is stored in a readable storage medium, such as a floppy disk, a Universal Serial Bus (USB) flash drive, a removable hard disk, a read-only memory (ROM), a random-access memory (RAM), a magnetic disk, or an optical disc of a computer, and includes several instructions for instructing a computer device (which may be a personal computer, a training device, or a network device) to perform the methods described in embodiments of this application.

All or some of the foregoing embodiments may be implemented using software, hardware, firmware, or any combination thereof. When software is used to implement the embodiments, all or some of the embodiments may be implemented in a form of a computer program product.

The computer program product includes one or more computer instructions. When the computer program instructions are loaded and executed on the computer, all or some of the procedures or functions in embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, training device, or data center to another website, computer, training device, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a training device or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

What is claimed is:

1. A video broadcasting method, comprising:
generating, by a first cloud phone under control of a first client, a first live video;
generating, by the first cloud phone and according to the first live video, a first high-definition live video and a first low-delay live video, wherein the first low-delay live video has a lower delay time than the first high-definition live video, and wherein the first low-delay live video has a lower definition than the first high-definition live video;
sending, by the first cloud phone, the first high-definition live video and the first low-delay live video to a live streaming platform;
sending, by the live streaming platform, the first low-delay live video to the first client;
sending, by the live streaming platform, the first high-definition live video to a second client;
switching, by the live streaming platform, control permission for the first cloud phone from the first client to the second client;
generating, by the first cloud phone, a second live video by the first cloud phone under control of the second client;
generating, by the first cloud phone and according to the first live video, a second high-definition live video and a second low-delay live video, wherein the second low-delay live video has a lower delay time than the second high-definition live video, and wherein the second low-delay live video has a lower definition than the second high-definition live video;
sending, by the first cloud phone, the second high-definition live video and the second low-delay live video to the live streaming platform;
sending, by the live streaming platform, the second low-delay live video to the second client; and
sending, by the live streaming platform, the second high-definition live video to the first client.

2. The video broadcasting method of claim 1, wherein switching the control permission comprises:
receiving, by the live streaming platform, a control permission switching request from the first client;
revoking, by the live streaming platform, the control permission of the first client for the first cloud phone based on the control permission switching request; and
granting, by the live streaming platform, the control permission for the first cloud phone to the second client.

3. The video broadcasting method of claim 1, wherein switching the control permission comprises:
receiving, by the live streaming platform, a control permission switching request from the second client;
forwarding, by the live streaming platform, the control permission switching request to the first client;
receiving, by the live streaming platform, a switching confirmation request from the first client in response to the control permission switching request, wherein the switching confirmation request indicates that the first client agrees to switch the control permission for the first cloud phone from the first client to the second client;
revoking, by the live streaming platform, the control permission of the first client for the first cloud phone based on the switching confirmation request; and
granting, by the live streaming platform, the control permission for the first cloud phone to the second client.

4. The video broadcasting method of claim 1, wherein generating the second live video comprises:
receiving, by the live streaming platform, a control instruction from the second client, wherein the control instruction controls the second cloud phone; and
generating, by the live streaming platform, the second live video based on the control instruction.

5. A computer program product comprising computer-executable instructions stored on a non-transitory computer-readable medium that, when executed by a processor, cause a computing device to perform a method by:
generating, by a first cloud phone under control of a first client, a first live video;
generating, by the first cloud phone and according to the first live video, a first high-definition live video and a first low-delay live video, wherein the first low-delay live video has a lower delay time than the first high-definition live video, and wherein the first low-delay live video has a lower definition than the first high-definition live video;
sending, by the first cloud phone, the first high-definition live video and the first low-delay live video to a live streaming platform;
sending, by the live streaming platform, the first low-delay live video to the first client;
sending, by the live streaming platform, the first high-definition live video to a second client;
switching, by the live streaming platform, control permission for the first cloud phone from the first client to the second client;
generating, by the first cloud phone, a second live video by the first cloud phone under control of the second client by the first cloud phone;
generating, by the first cloud phone and according to the first live video, a second high-definition live video and a second low-delay live video, wherein the second low-delay live video has a lower delay time than the second high-definition live video, the second low-delay live video has a lower definition than the second high-definition live video;

sending, by the first cloud phone, the second high-definition live video and the second low-delay live video to the live streaming platform;

sending, by the live streaming platform, the second low-delay live video to the second client; and sending, by the live streaming platform, the second high-definition live video to the first client.

6. The computer program product of claim 5, wherein the instructions further cause the computing device to perform the method by:

receiving, by the live streaming platform, a control permission switching request from the first client;

revoking, by the live streaming platform, the control permission of the first client for the first cloud phone based on the control permission switching request; and granting, by the live streaming platform, the control permission for the first cloud phone to the second client.

7. The computer program product of claim 5, wherein the instructions further cause the computing device to perform the method by:

receiving, by the live streaming platform, a control permission switching request from the second client;

forwarding, by the live streaming platform, the control permission switching request to the first client;

receiving, by the live streaming platform, a switching confirmation request from the first client in response to the control permission switching request, wherein the switching confirmation request indicates that the first client agrees to switch the control permission for the first cloud phone from the first client to the second client;

revoking, by the live streaming platform, the control permission of the first client for the first cloud phone based on the switching confirmation request; and granting, by the live streaming platform, the control permission for the first cloud phone to the second client.

8. The computer program product of claim 5, wherein the instructions further cause the computing device to perform the method by:

receiving, by the live streaming platform, a control instruction from the second client, wherein the control instruction controls the second cloud phone; and generating, by the live streaming platform, the second live video based on the control instruction.

9. A system comprising:

a first cloud phone configured to:
generate a first live video under control of a first client;
generate a first high-definition live video and a first low-delay live video according to the first live video, wherein the first low-delay live video has a lower delay time than the first high-definition live video, and wherein the first low-delay live video has a lower definition than the first high-definition live video;
send the first high-definition live video and the first low-delay live video;
generate a second live video under control of a second client;
generate a second high-definition live video and a second low-delay live video according to the second live video, wherein the second low-delay live video has a lower delay time than the second high-definition live video, and wherein the second low-delay live video has a lower definition than the second high-definition live video; and send the second high-definition live video and the second low-delay live video; and a live streaming platform communicatively coupled to the first cloud phone and configured to:
receive the first high-definition live video and the first low-delay live video;
send the first low-delay live video to the first client;
send the first high-definition live video to the second client;
switch control permission for the first cloud phone from the first client to the second client;
receive the second high-definition live video and the second low-delay live video;
send the second low-delay live video to the second client; and
send the second high-definition live video to the first client.

10. The system of claim 9, wherein the live streaming platform is further configured to:

receive a control permission switching request from the first client;

revoke the control permission of the first client for the first cloud phone based on the control permission switching request; and grant the control permission for the first cloud phone to the second client.

11. The system of claim 9, wherein the live streaming platform is further configured to:

receive a control permission switching request from the second client;

forward the control permission switching request to the first client;

receive a switching confirmation request from the first client in response to the control permission switching request, wherein the switching confirmation request indicates that the first client agrees to switch the control permission for the first cloud phone from the first client to the second client;

revoke the control permission of the first client for the first cloud phone based on the switching confirmation request; and grant the control permission for the first cloud phone to the second client.

12. The system of claim 9, wherein the live streaming platform is further configured to receive a control instruction from the second client, wherein the control instruction controls the second cloud phone, and wherein the first cloud phone is further configured to generate the second live video based on the control instruction.

13. The system of claim 9, wherein the live streaming platform is further configured to send the first high-definition live video to the first client when the first client is a viewer.

14. The system of claim 9, wherein the live streaming platform is further configured to send the first low-delay live video to the second client when the second client is a host.

15. The computer program product of claim 5, wherein the instructions further cause the computing device to perform the method by sending the first high-definition live video to the first client when the first client is a viewer.

16. The computer program product of claim 5, wherein the instructions further cause the computing device to perform the method by sending the first low-delay live video to the second client when the second client is a host.

17. The video broadcasting method of claim 1, wherein the first cloud phone and the first client are located in a first region, wherein the first cloud phone runs in a first container;

wherein switching the control permission comprises migrating an image of the first cloud phone to a second container online to create a second cloud phone by the live streaming platform, wherein the second cloud phone and the second client are located in a second region, wherein an operating system is configured in the image, wherein an application is configured in the operating system, wherein the application comprises a live streaming application, and wherein the second cloud phone is used to replace the first cloud phone.

18. The computer program product of claim 5, wherein the first cloud phone and the first client are located in a first region, wherein the first cloud phone runs in a first container, wherein the instructions further cause the computing device to perform the method by migrating an image of the first cloud phone to a second container online to create a second cloud phone by the live streaming platform, wherein the second cloud phone and the second client are located in a second region, wherein an operating system is configured in the image, wherein an application is configured in the operating system, wherein the application comprises a live streaming application, and wherein the second cloud phone is used to replace the first cloud phone.

19. The system of claim 9, wherein the first cloud phone and the first client are located in a first region, wherein the first cloud phone runs in a first container, wherein the live streaming platform is further configured to migrate an image of the first cloud phone to a second container online to create a second cloud phone, wherein the second cloud phone and the second client are located in a second region, wherein an operating system is configured in the image, wherein an application is configured in the operating system, wherein the application comprises a live streaming application, and wherein the second cloud phone is used to replace the first cloud phone.

20. The system of claim 9, wherein the live streaming platform is an online audio and video platform.

* * * * *